United States Patent

Hikosaka

[15] 3,665,416

[45] May 23, 1972

[54] ON-LINE REAL TIME DATA PROCESSING SYSTEM

[72] Inventor: Mitsuo Hikosaka, 1590-18, Oaza Kakura Kasuga-cho, Chikushi-gun, Fukuoka-ken, Japan

[22] Filed: Oct. 5, 1970

[21] Appl. No.: 77,860

[30] Foreign Application Priority Data

Oct. 9, 1969 Japan....................................44/81005
June 10, 1970 Japan....................................45/49464

[52] U.S. Cl...........................................................340/172.5
[51] Int. Cl...........................................G06f 9/00, G06f 3/00
[58] Field of Search................................340/172.5; 235/157

[56] References Cited

UNITED STATES PATENTS

| | | | |
|---|---|---|---|
| 3,585,606 | 6/1971 | Evans et al. | 340/172.5 |
| 3,573,855 | 4/1971 | Cragon et al. | 340/172.5 |
| 3,473,159 | 10/1969 | Cantrell et al. | 340/172.5 |
| 3,576,544 | 4/1971 | Cordero et al. | 340/172.5 |
| 3,321,747 | 5/1967 | Adamson | 340/172.5 |

*Primary Examiner*—Paul J. Henon
*Assistant Examiner*—Mark Edward Nusbaum
*Attorney*—John Lezdey

[57] ABSTRACT

An on-line real time data processing system having a buffer storage and in which the flow of input information into the buffer storage is controlled in accordance with the amount of information stored in the buffer storage thereby to keep the amount of stored information at an optimum level for the entire system as well as to prevent saturation of the buffer storage with the input information. This data processing system is adapted especially for a radar track information processing system. A register is adapted to effect counting in synchronism with the counting of the readout address counter of the buffer storage in such a manner that the number of counts of said register is a few counts smaller than that of said read-out address counter at all times. The number of counts of said register is compared with that of the write-in address counter of the buffer storage by a comparator which, upon coincidence of those numbers of counts, generates a coincidence signal. This coincidence signal is supplied to an information input gate in order to shut off the flow of input information into the buffer storage. An upper-limit counter and a lower-limit counter are provided which effect countings in synchronism with the counting of the read-out address counter in such a manner that the number of counts of said upper-limit and lower-limit counters are, respectively, appropriate numbers of counts larger than that of said read-out address counter at all times. Those numbers of counts of said upper-limit and lower-limit counters are compared with that of said write-in address counter by an upper-limit comparator and a lower-limit comparator, respectively. These comparators generate coincidence signals upon coincidence of their numbers of counts and that of the write-in address counter. The coincidence signals are supplied to a detection-reference controller which, in response thereto, select the optimum detection reference in the track information detecting structure of the radar track information processing system so that an optimum amount of input information may be fed to the buffer storage. If the amount of information being supplied to the buffer storage falls beyond control of the detection-reference controller, an interference-eliminating circuit selector is actuated by the detection-reference controller to automatically select the optimum interference-eliminating circuit.

10 Claims, 31 Drawing Figures

INVENTOR.
MITSUO HIKOSAKA
BY John Lezdey
ATTORNEY

INVENTOR.
BY John Lezdey
ATTORNEY

INVENTOR
BY John Lezdey
ATTORNEY

INVENTOR

BY John Lezdey
ATTORNEY

INVENTOR

BY John Lezdey

ATTORNEY

INVENTOR.
MITSUO HIKOSAKA
BY
ATTORNEY

INVENTOR

BY

ATTORNEY

INVENTOR
BY John Lezdey
ATTORNEY

INVENTOR.
BY John Lezdey
ATTORNEY

INVENTOR.
[illegible]
BY
John Lezdey
ATTORNEY

INVENTOR
MITSUO HIKOSAKA
BY John Lezdey
ATTORNEY

INVENTOR
MITSUO HIKOSAKA
BY John Lezdey
ATTORNEY

INVENTOR

MITSUO MIKOSAKA

BY John Lezdey

ATTORNEY

INVENTOR
BY John Lezdey
ATTORNEY

INVENTOR.
MITSUO HIKOSAKA
BY John Lezdey
ATTORNEY

INVENTOR
MITSUO HIRASAWA
BY
John Lezdey
ATTORNEY

INVENTOR.
MITSUO [illegible]
BY John Lezdey
ATTORNEY

INVENTOR.
MITSUO HIRASAWA
BY John Lezdey
ATTORNEY

INVENTOR
BY John Lezdey
ATTORNEY

PATENTED MAY 23 1972 3,665,416

SHEET 20 OF 21

INVENTOR.

MITSUO HIKOSAKA

BY John Lezdey

ATTORNEY

INVENTOR

MITSUO HIROSAWA

BY John Lezdey

ATTORNEY

ON-LINE REAL TIME DATA PROCESSING SYSTEM

BACKGROUND OF THE INVENTION

1. Field of the Invention

This invention relates to an on-line real time data processing system for a radar track information processing system. More particularly, it relates to such systems which are adapted to effect automatic control of the amount of radar track information provided as an input and other related automatic controls for the peripheral units.

In Brief, the present automatic control system functions to detect and control the amount of track information input to a buffer storage thereby to control the peripheral units such as a digital track information processor and a radar equipment. The detection of the amount of input information is made at all times by either an arrangement comprising two sets of counters, counter controls, comparators and storages or an arrangement comprising a limited addition-and-subtraction counter, two sets of state detectors and storages, while occurrence of the saturation and double write-in of input data in the buffer storage is prevented by either an arrangement comprising a register, a comparator and a time corrector or an arrangement comprising a limited addition-and-subtraction counter, an idle-reading prohibiting control and a double write-in prohibiting control. In the digital track information processor the optimum detection reference, which has heretofore been set by manual selection, is determined by an automatic detection reference controller. Furthermore, detection of the faults caused by interference waves to automatically select the optimum one of the interference-wave eliminating circuits is made by an automatic selector for the interference eliminating circuits. Moreover, the automatic control system has the function of displaying various operating states.

Description of the Prior Art

A problem common to on-line real time systems is the saturation of a storage as caused by temporary excessive generation of randomly inputted information. Usual methods for prevention of the occurrence of the saturation are the increase in storage capacity, the program control and the like, which however have provided no basic solution. The increase in storage capacity is not only uneconomical but also subject to limitation. In case of the program control, the manner of controlling an input unit and periheral units is modified after the control program corresponding to the changes in state has been read out on magnetic cores in an electronic computer, so that the processing period of time becomes uselessly long. An instantaneous processing and a control prior to the occurrence of faults or the changes in state are accordingly almost impossible.

SUMMARY OF THE INVENTION

According to one aspect of the present invention, the amount of information inputted to a buffer storage is at all times monitored so that it lies within a range corresponding to the processing capability of the particular system. These controls are effected instantaneously or anticipatively in response to the changes in state. Even when the amount of input information is excessively increased on account of any abnormal state in the peripheral units, the storage will be inhibited from being saturated. The inhibition is attained by appropriately carrying out various controls for the peripheral units when the storage is becoming saturated. These states of operation may be easily monitored by an operator.

Although in the following description the present invention will be set forth in connection with a radar information processing system, it should be understood that the invention is not restricted to such, but may also be applied to a wide variety of on-line real time data processing system.

It is accordingly an object of the invention to provide an automatic control unit capable of effecting a control for always maintaining an information input quantity corresponding to the processing capability (performance) of an on-line real-time information processing system, a control for prevention of the saturation of a storage and various effective controls for an end unit.

As described in the foregoing, the automatic control unit according to the invention has the information input quantity detecting function, the automatic memory control function, and the automatic control function for a digital information processor and for a radar equipment. Basically it carries out detection of the information quantity stored in a buffer storage unit, i.e., the information input quantity, upon which it performs a variety of related controls.

DETAILED DESCRIPTION OF THE INVENTION

Figure 1:
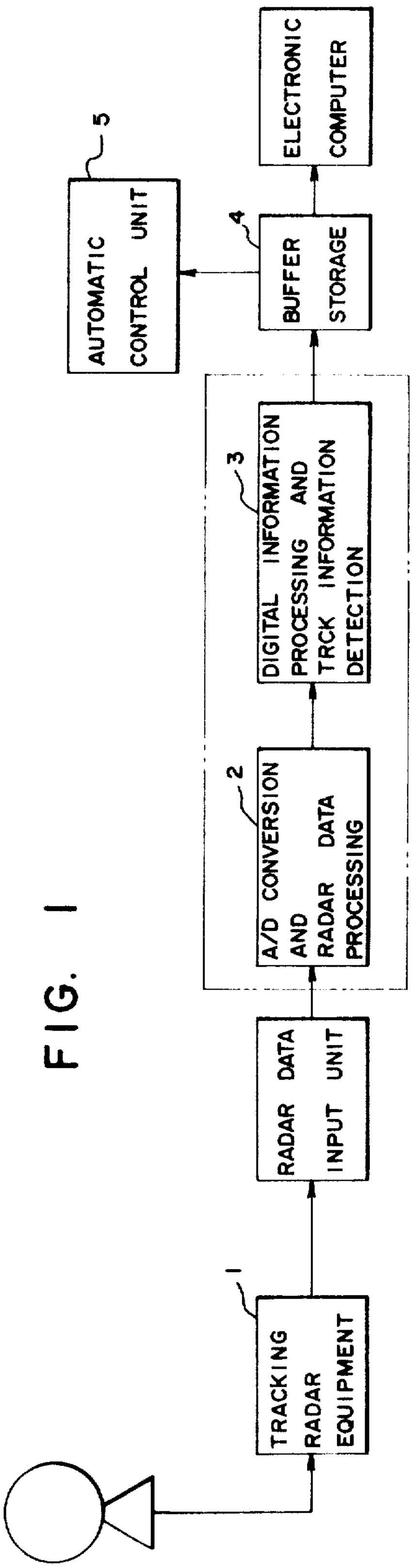
FIG. 1 is a block diagram showing a radar track information processing system embodying the present invention.

As is well known, it is an indispensable requisite to place a buffer storage between an on-line real time system and an electronic computer in order to process information randomly fed to the storage on a real time basis. In the buffer storage write-in is accomplished every time information is supplied thereto, and read-out takes place upon reception of program instructions from the electronic computer. Since the circulating writeein system now being used in the ordinary storages is unsuitable, the progressive write-in and read-out system have been employed wherein the respective write-in and read-out address functions are independent of each other. With the progressive write-in and read-out address systems, however, the amount of stored information is not detectible. Hence, it is substantially impossible to monitor the amount of information stored in the buffer storage, and accordingly the storage has been used only for buffer purposes: time control and information-form conversion. This detection of the stored information in the buffer storage can be effectively made by the most essential function of the present system, that is, the information input quantity detecting function.

The information input quantity detecting function will now be described in detail. It may be performed in two methods; description will be made first with respect to one method which employs two sets of counters, counter controls, comparators and storages.

Assuming in the buffer storage that the storage capacity (which will hereinafter be referred to as the total number of addresses) be A, the number of counts in the read-out address counter be X, the number of counts in the write-in address counter be Y, and the number of vacant addresses (in which information is not written-in) be Z, then the following equation may be obtained:

$$Z = A - Y + X \qquad \text{Eq. 1}$$

A certain number of counts is set in the additional counter (hereinafter called the "counter B") when starting, and count-up is effected in response to control signals from the read-out address counter in synchronism with the counting thereof. In other words, both of the read-out and write-in address counters start from count zero while the Counter B starts from the number of counts as predetermined by setting the counter control.

This number of counts set in the Counter B when starting is expressed in the ratio of the number to the total number of addresses A of the memory, that is, $A\beta$ ; (where $\beta$ is represented in percentage).

The number of counts B in the Counter B therefore is $$B = A\beta + X \qquad \text{Eq. 2}$$

Under the conditions that the number of counts B in the Counter B coincides with the number of counts Y in the write-in address counter, $$Y = B$$

$$* \; Y = A\beta + X \qquad \text{Eq. 3}$$

The coincidence is detected by the comparator.

The number of vacant addresses Z of the memory under such conditions, is expressed as follows: Substituting Eq. 3 $Y = A\beta + X$ into Eq. 1 $z = A - Y + X$, $$z = A - (A\beta + X) + X$$

$$* \; z = A\,(1 - \beta) \qquad \text{Eq. 4}$$

It is understood from above that replacement of the accumulative number of counts Y with the accumulative number of counts X gives Eq. 4 $z = A\,(1 - \beta)$ which holds at any time when Y = B, irrespective of the numbers of accumulative count X and Y.

Concretely, it is now assumed that the number of counts A in the Counter B when starting be set at 50 percent of the total number of addresses A of the memory. Then, when the number of counts B in the Counter B and the number of counts Y in the write-in address counter coincide with each other, that is, under the state that Y = B, the number of vacant addresses Z becomes:

$$z = A\,(1 - 0.5) = 0.5A$$

Therefore, $A - z$ (the amount of stored information) is equal to 0.5A, which means that the quantity of information stored in the memory has reached 50 percent of the total number of addresses. This state is stored in the additional storage.

A plurality of such detection points may be provided as desired, whereby the amount of information stored in the buffer storage is monitored more finely. The monitoring of the amount of stored information enables various controls of the input and peripheral units in a variety of aspects of performance. For example, when the amount of information input reaches a certain detection point (80 percent), an input information of low priority will be automatically transferred to a stand-by storage and an instantaneous hold command will be given to the peripheral units. Alternatively, a preference command according to priority (rejection of information of low priority) will be generated. Furthermore, when the amount of information input drops below a certain detection point (10 percent), input of inactive-time processing information temporarily stored in a magnetic disc memory, etc. will be automatically controlled within an allowable range. In this specification, description will be made of the case where two detection points are provided to detect the amount of information input to a radar information processing system. It is to be noted that clock pulses required for flip-flop circuits which are used in the automatic control unit of the invention are supplied from the buffer storage.

1.0 On-Line Real Time Radar Data Processing System

In FIG. 1, there is shown a radar data processing system having an automatic control unit of the invention.

A tracking radar equipment 1 generates radar analog video and other related radar data such as master trigger and position data which are fed through a radar data input unit to a digital radar data processor enclosed within a dash rectangle. The processor is basically composed of an A/D convertor and radar data processing mechanism 2, and a digital data processing and track data detecting mechanism 3.

The A/D convertor and radar data processing mechanism 2 quantamizes the radar analog video supplied from the radar equipment 1, and processes a variety of radar data such as master trigger and position data so as to convert them into the required digital (binary-coded) position data-range, azimuth angle, etc. The digital radar video and the position data thus obtained are fed to the digital data processing and track data detecting mechanism 3.

The digital data processing and track data detecting mechanism 3 extracts the proper track information from the digital radar video and the position data on the basis of statistical detection references to thereby establish the track information. The track information thus established are fed through a buffer storage 4 to an electronic computer.

The buffer storage 4 has the buffer function in supplying to the electronic computer the track information which is inputted at random from the mechanism 3. The storage 4 temporarily stores the random input information from the mechanism 3, and reads out and supplies the information one by one at the request of the electronic computer. The electronic computer effects perfect establishment, correlation and tracking of the track information which is read out from the buffer storage 4. The results thus obtained are outputted for display, transfer, renewal of record, or the like.

The automatic control unit 5 according to this invention monitors the amount of information stored in the buffer storage 4, and controls the track data detecting mechanism 3 and the radar equipment 1 so as to keep the amount of input information at an optimum level for the system at all times. Detailed description thereof will be made in Section 3.0.

2.0 Constituting Circuit Elements

Figure 2:
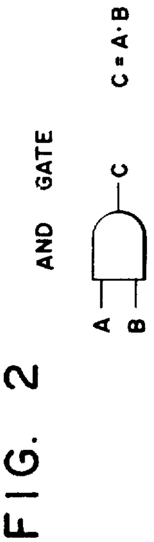
FIGS. 2 through 6 are explanatory diagrams showing the elements constituting the system of FIG. 1.
Figure 3:
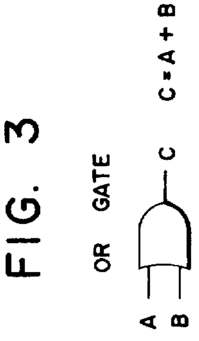
Figure 4:
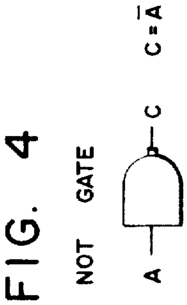
Figure 5:
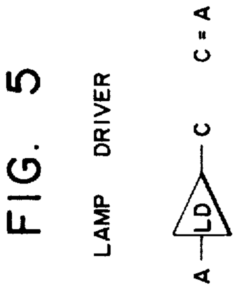
Figure 6:
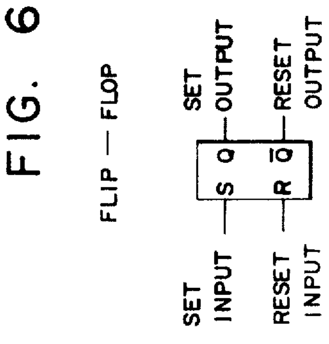

In FIGS. 2 to 6, there are shown constituting circuit elements used in the present on-line real time system. FIG. 2 illustrates an AND gate, the output C of which is "true" only when inputs A and B are simultaneously "true." FIG. 3 depicts an OR gate, with its output C being "true" if either one of inputs A and B is "true". Shown in FIG. 4 is a NOT gate (inverter) whose output C inverts an input A. FIG. 5 shows a lamp driver, wherein when an input A is "true," an output C turns on a lamp to-be-connected. FIG. 6 is a diagram illustrating a flip-flop. Herein, a set input is represented by S, a reset input by R, a set output by Q, and a reset output by $\bar{Q}$, with a clock pulse input being omitted. Where the set input S is "-true" and the reset input R is "false" (0), the flip-flop is set with its output Q being "true" and $\bar{Q}$ being "false." Operations under the remaining conditions are shown in the right-hand table in the figure.

Figure 7:
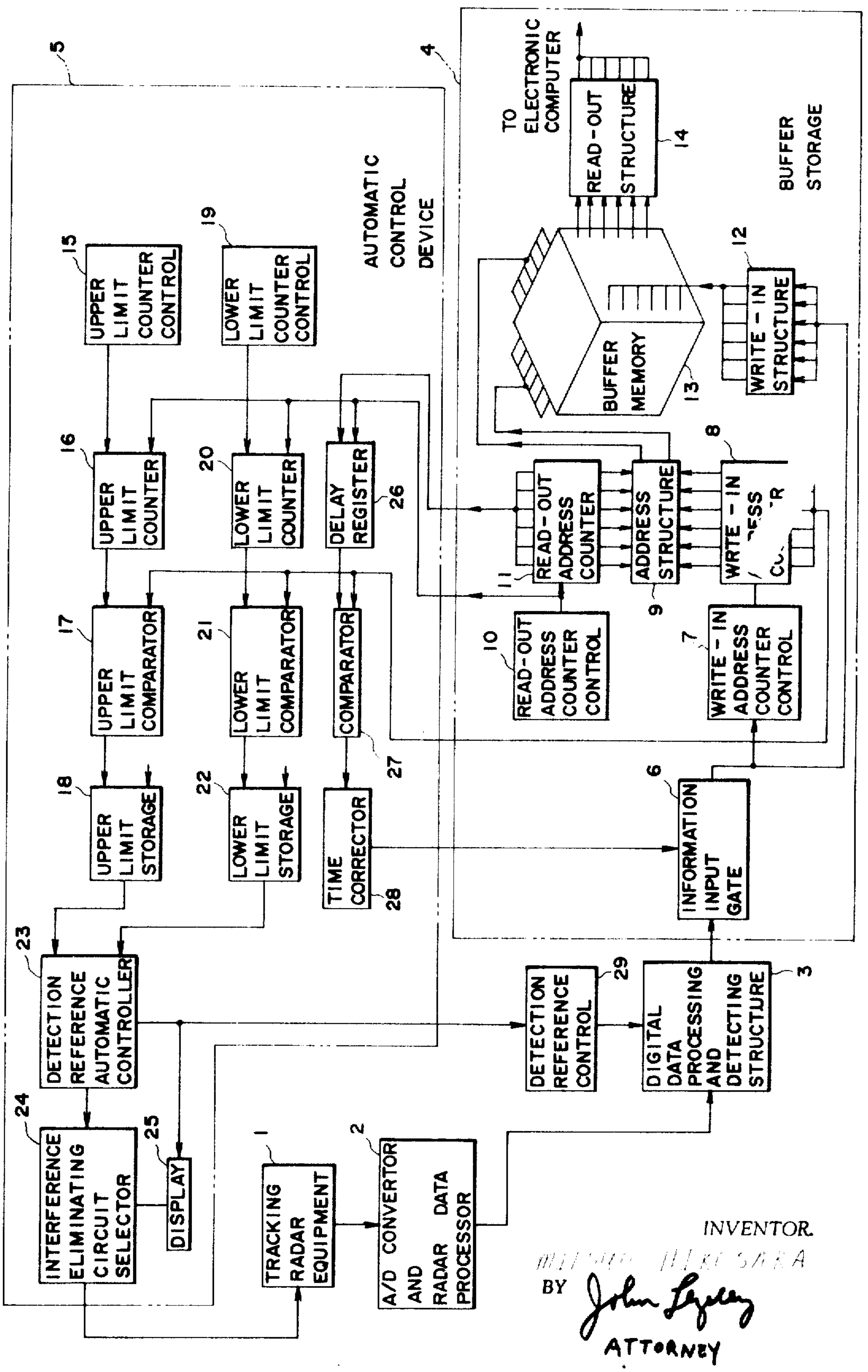
FIG. 7 is a block diagram showing in detail the arrangement of an automatic control unit and a buffer storage unit both being illustrated in FIG. 1.

3.0 Automatic Control Unit:

Referring to FIG. 7, the radar analog video and radar data generated by the radar equipment 1 are fed to the A/D convertor and radar data processing mechanism 2 where they are converted into digital video and digital position data such as range data, azimuth data. The digital video and digital position data thus obtained are fed to the digital track data processing and detecting mechanism 3. The track information generated by the mechanism 3 is supplied to the buffer storage 4. In order to effectively extract the track information from a number of radar data containing clutters and the like, the digital track data processing and detecting mechanism 3 is controlled on the basis of a plurality of statistical detection references. The selection of the detection references has heretofore been made by manuallly selecting one of switch positions (e.q., of MODE 1 to MODE 5) of a detection reference controller 29 at the discretion of an operator, etc. However, it is difficult to make the optimum selection since the operator cannot monitor how the track data is being detected, the data is being fed to the buffer storage, and the data is being processed by the electronic computer. The present invention enables such step-like selection to be made automatically.

The buffer storage 4 comprises an information input gate 6, a write-in address counter control 7, a write-in address counter 8, an address mechanism 9, a read-out address counter control 10, a read-out address counter 11, a write-in mechanism 12, a buffer memory 13, and a read-out mechanism 14. Every time the track information is fed to the input gate 6 from the digital track information processing and detecting mechanism 3, the gate 6 energizes the write-in address counter control 7 to generate a write-in address counter controlsignal and it also supplies the track information to the write-in mechanism 12. The write-in address counter control 7 produces a control signal to effect count-up of the write-in address counter in response to the write-in address counter control signal. The write-in address counter 8 counts up in response to the control signal and specifies a storage address in the memory in which the track information is to be written by means of the address mechanism 9. The write-in mechanism 12 writes in the track information supplied from the information input gate 6, at the specified address in the memory. The read-out address counter control 10 generates, at the read-out command of the electronic computer, a read-out address counter control signal and feeds it to the read-out address counter 11. The read-out address counter 11 counts up in response to the control signal, indicates the address in the memory at which the track information to be read out is stored, and feeds the tread out track information to the electronic computer.

Since it is well known how write-in and read-out are accomplished in the buffer storage, a detailed explanation thereof is omitted.

The automatic control unit 5 comprises the information input amount detecting part including an upper-limit counter control 15, an upper-limit counter 16, an upper-limit comparator 17 and an upper-limit storage 18, as well as a lower-limit counter control 19, a lower-limit counter 20, a lower-limit comparator 21 and a lower-limit storage 22; the automatic storage control part including a delay register 26, a comparator 27 and a time corrector 28; the automatic detection-reference control part including an automatic detection-reference controller 23 and a controller 29; the automatic interference-state detecting part including an automatic interference-eliminating circuit selector 24; the automatic interference-eliminating circuit selecting part including an automatic interference-climinating circuit selecting circuit; and the various-state displaying part including a display 25.

This information input amount detecting part is composed of an upper-limit detecting mechanism including the upper-limit counter control 15, the upper-limit counter 16, the upper-limit comparator 17 and the upper-limit storage 18, and a lower-limit detecting mechanism including the lower-limit counter control 19, the lower-limit counter 20, the lower-limit comparator 21 and the lower-limit storage 22. The upper-limit and lower-limit detecting mechanisms monitor the amount of stored information with reference to the upper-limit and lower-limit detection points. This is just like the function of a temperature controller provided in an automatic air-conditioned room in which the room temperature is controlled with reference to the predetermined upper-limit and lower-limit points of temperature, to thereby maintain the room temperature between such points at all times.

One of the most important features of the present invention is the function of detecting the amount of information stored in the buffer storage with reference to the upper-limit and lower-limit detecting points.

In the radar information processing system herein described, the amount of track information input at the starting point of operation is adjusted to such a value as exceeding the processing capability of the system per unit time. Then, the amount of stored information increases to a value between the predetermined lower-limit and upper-limit values. Thereafter, control of the related units is made by the automatic control function in such a way that the amount of information input, at all times, be equal to the optimum value commensurate with the processing capability of the system. Thus, by maintaining the amount of stored information between the upper-limit and lower-limit values, it is possible to control the amount of information input so as to be commensurate with the amount of information read out from the buffer storage.

It is to be fully understood that according to this invention an instantaneous control responsive to various changes in conditions, which cannot be effected through the program control, is performed.

The upper-limit counter 16 starts the count-up action from a certain number of counts which is preset by the upper-limit counter control 15. That is, the upper-limit counter 16 has the predetermined number of counts forcibly set when it starts operation or when a start clear action (the normal starting operation) is made in the buffer storage. The forcibly set number of counts is now represented by $A\beta_1$ (where A is the storage capacity or the toral number of counts).

After starting, the upper-limit counter 16 counts up one by one from the forcibly set number of counts $A\beta_1$ every time a counter control signal is supplied from the read-out address counter controller 10. The count of the upper-limit counter 16 is always transmitted to the upper-limit comparator 17. The count-up is made in synchronism with the counting of the read-out address counter 11. Assuming that the number of counts in the address counter 11 be X, then the number of counts in the upper-limit counter 16 is represented by $A\beta_1 + X$ (the read-out address counter 11 starts from count 0).

The upper-limit comparator 17 compares the number of counts ($A\beta_1 + X$) in the upper-limit counter 16 and that in the write-in address counter 8 (hereinafter represented by $y$) in order to detect the coincidence therebetween. As previously described, the number of vacant information address Z during detection of the coincidence, i.e., under the conditions that $y = A\beta_1 + X$ is:

$$z = A - y + x$$

Substituting $y = A\beta_1 + x$ then, $$z = A(1 - \beta_1)$$

From this, the amount of information stored in the buffer storage when the upper-limit comparator 17 detects the coincidence in the numbers of counts ($y = A\beta_1 + X$) is:

(Total Number of Addresses) − (Number of Vacant Addresses) $= A - z$

Substituting $z = A(1 - \beta_1)$ then, $$A - z = A - A(1 - \beta_1) = A\beta_1$$

Thus, when the number of counts in the upper-limit counter 16 and that in the write-in address counter 8 become equal to each other, it is understood that the amount of information stored in the buffer storage have reached the point of the upper-limit value $\beta_1$. The upper-limit detecting signal is fed to the upper-limit storage 18. This upper-limit storage 18, in response to the detecting signal from the upper-limit comparator 17 the counter control signal from the read-out address controller 10 and the counter control signal from the write-in address counter controller 7, store whether the amount of information stored in the buffer storage is lower or higher than the predetermined upper-limit.

The manner of detecting the amount of stored information with reference to the lower-limit point will be described briefly since it is similar to the detection with reference to the upper-limit point except that the preset number of counts for the counter 20 at starting is different from that for the counter 16. The lower-limit counter control 19 has the same function as the upper-limit counter control 15, and sets a certain number of counts (hereinafter termed $A\beta_2$) when the lower-limit counter 20 starts to count up.

The lower-limit counter 20 starts to count up from the preset number of counts ($A\beta_2$) quite in the same manner as the upper-limit counter 16. The lower-limit comparator 21 counts up the number of counts in the lower-limit counter 20 and that in the write-in address counter 8, whereby upon coincidence of them, it generates a coincidence signal which is supplied to the lower-limit storage 22.

More specifically, such a coincidence signal is generated under the condition that $y = A\beta_2 + x$. This signal indicates that the number of vacant addresses is $Z = A(1 - \beta_2)$ and that the amount of information stored in the buffer storage has reached the point of lower-limit value $\beta_2$. The lower-limit storage 22 stores if the amount of information stored in the buffer storage is above or below the lower-limit value $\beta_2$ in response to signal from the lower-limit comparator 21 and the address counter control signals from the controllers 10 and 7.

Assuming now that the upper-limit value $\beta_1$ and the lower-limit value $\beta_2$ be respectively preset at 70 percent and 50 percent, then the lower-limit storage 22 stores whether the amount of information stored in the buffer storage is higher or lower than 50 percent of the storage capacity, while the upper-limit storage 18 similarly stores if it is higher or lower than 70 percent.

It is to be understood that on the basis of the storage states of the upper-limit and lower-limit storages it is possible to easily monitor the amount of information stored in the buffer storage.

AUTOMATIC DETECTION-REFERENCE CONTROLLER

The automatic detection-reference controller 23 effects a stepwise control of the detection references for the digital track data detecting structure 3 through the detection-reference controller 29 in response to the storage states of the upper-limit storage 18 and the lower-limit storage 22. It is assumed, in this embodiment that the stepwise detection-reference control in the digital track data detecting structure 3 is made in five steps from Set No. 1 to Set No. 5 and that the detection reference is sequentially shifted from Set No. 1 to Set No. 5.

In brief, the automatic detection-reference controller 23 functions to automatically select the optimum detection reference so as to provide the optimum amount of input information to the buffer storage.

Now, if the detection reference is set at No. 3 and the amount of information stored in the buffer storage is optimum, that is, between the upper-limit value $\beta_1$ and the lower-limit one $\beta_2$, then the present amount of input information will be judged optimum by the upper-limit and lower-limit storages and the automatic detection-reference controller will maintain the present detection reference Set No. 3. If the amount of information input to the buffer storage is small and the amount of information stored therein is below the lower-limit value $\beta_2$, then judgement will be made by means of the lower-limit storage 22 to the effect that the amount of input information is smaller than the suitable quantity and the automatic detection-reference controller 23 will immediately select the detection reference Set No. 2 thereby increasing the amount of track information detected by the digital track data detecting structure 3. In contrast, if during the detection reference Set No. 3 the amount of input information increases above the suitable amount and hence the amount of stored information exceeds the upper-limit value $\beta_1$, then the state will be immediately detected by the upper-limit storage and the detection reference Set No. 4 will be selected by the automatic detection-reference controller 23. Therefore, the amount of track information detected by the digital track data detecting mechanism 3 and accordingly the amount of data input to the buffer storage 4 will decrease, causing the amount of stored information to approach the optimum value. Such control is stepwise performed by automatically selecting the optimum detection reference which provides the optimum amount of input information in view of the amount of information read out from the buffer storage.

The automatic interference-eliminating circuit selector 24 functions to detect such a state in the interference waves, or the like, which adversely affects the operation of the radar system so as to generate a lot of pseudo track information. The automatic selector 24 functions also to select the optimum one among several interference-wave eliminating circuits provided in the radar equipment. The detection of the interference state is made on the basis of which detection reference is being selected by the automatic detection-reference controller 23 and in response to the monitoring of the amount of information stored in the buffer storage as attained by the upper-limit and lower-limit storages 18, 22.

More specifically, the automatic selector 24 judges the system to be out of order due to interference waves etc., if the amount of input information to the buffer storage is yet abnormal (too much or too little) when the detection reference Set No. 5 (with which the minimum amount of track information is provided) or Set No. 1 (with which the maximum amount of track information is provided) is selected in the automatic detection-reference controller 23. In this case, it is assumed that the amount of information input to the buffer storage may not be controlled within such control range of the detection references as designed. For example, when the radar equipment is subjected to interference as caused by noises, pulse waves or the like, an excessive amount of pseudo track data will be generated and the amount of input information will increase to such a value as being beyond the control of the detection references. Furthermore, with some types of interference waves, the radar receiver will be saturated and the radar video will approach null. Therefore, the amount of track information detected is decreased, so that the amount of input information will become too little. The interference-eliminating circuit selector 24, upon detection of an interference state, sequentially selects several interference-wave eliminating circuits in the radar equipment, the selection of which have heretofore been made manually. In this specification, description is made on the assumption that the radar equipment has five interference-wave eliminating circuits No. 1 to No. 5. Whether one of the interference eliminating circuits which is being selected is proper or not may be easily determined by monitoring the amount of information input to the buffer storage. When an interference state is detected, the interference eliminating circuits are sequentially selected and eventually one of the circuits corresponding to the particular interference state is held, so that the amount of information input to the buffer storage will become a proper value. If an improper interference-eliminating circuit is selected, any abnormality in the quantity of input information in the buffer storage unit will still remain unchanged. Such states are accurately judged from the storage states of the upper-limit and lower-limit storages 18 and 22. The operation will now be briefly stated. When an excessive amount of pseudo radar wake information is produced upon reception of interference waves by the radar equipment, the automatic interference-state detecting function will detect such interference state on the basis of the fact that the detection-reference control range by the automatic detection-reference controller 23 has been exceeded. This detection causes the interference-eliminating circuit selector to generate a signal in order to select the Interference Eliminating Circuit No. 1 in the radar equipment, thus selecting the Circuit No. 1. If the input information quantity in the buffer storage unit becomes suitable by the selection of the Interference Eliminating Circuit No. 1, then this selection will be held. Whereas, if the abnormal state in the amount of input information in the buffer storage unit remains unchanged, then judgement will be made to be unsuitable whereupon the next Circuit No. 2 will be selected. In this way, selections for the optimum interference-eliminating circuit are sequentially made until the final Interference Eliminating Circuit No. 5. In case no optimum interference-eliminating circuit is present, judgement is made that any related equipment is faulty and such state is monitored through the display device 25. The fact that the quantity of input wake information in the buffer storage unit becomes normal through selection of the optimum interference-eliminating circuit means that the particular interference-eliminating circuit has the optimum removal effect for the interference waves.

It is to be noted that as described above, the automatic on-line real-time wake information processing system performs rapidly and accurately the operator's monitoring, judgement and the accompanying controls which are very difficult with manual controls. Although omitted in the explanation of details in performance in this specification, the distinction between an interference state due to an abnormally large amount of input information in the buffer storage unit and one due to an abnormally small amount of the same permits classification of such interference state dependent upon the types of interference waves and allows a more effective selection of the interference eliminating circuits.

The automatic memory control device comprises the delay register 26, the comparator 27 and the time corrector 28. It operatively avoids saturation of the buffer storage unit which occurs from a temporary excessive generation of input information on account of any cause, and prevents duplicate write-in of information. The automatic control device has control functions which have no relation to the remaining functions of the automatic control unit according to the invention, and which are independently carried out. A memory of this type usually used in the buffer storage unit is not of the circulating write-in type, but is of the progressive write-in and read-out type wherein the write-in and read-out address functions are individually independent. As a result, upon generation of an excessive amount of input information, it undergoes saturation. Therewith, the specified number of write-in addresses exceeds the specified number of read-out addresses, so it writes in new information onto information addresses where previously written-in information still remain without being read out, to thereby store misinformation. Thus, the most serious defects of the prior art buffer storage unit are saturation of the memory and occurrence of misinformation as caused by generation of an excessive amount of input information, with the result that the unit brings about a serious trouble in an electronic computer to-be-connected.

The automatic memory control device is a control means aiming at protecting the storage unit from any faults accompanying to the excessive generation of input information, thereby enabling normal storage and maintenance of information under any conditions. Referring to FIG. 7, the delay register 26 stores in parallel the number of counts smaller by one count than the present number of counts in the read-out address counter 11 by the control of a count control signal from the read-out address counter controller 10. The storing action is effected each time the read-out address counter 11 counts up. The comparator 27 makes the comparison between the stored number of counts in the delay register 26 and the number of counts in the write-in address counter 7, and upon coincidence of the count numbers, it provides a coincidence signal. Detection of the coincidence signal will now be explained in mathematical expressions. Assuming that the full capacity (the total number of addresses) of the memory of the buffer storage unit be A, the number of counts in the write-in address counter be $y$, and that the number of counts in the read-out address counter be X, then the number of counts in the delay register 26 becomes $(X - 1)$. Now, if upon the occurrence of an excessive amount of input information the write-in address counter completes write-in of the all the addresses of the memory amounting to A and comes up with one count before the number of counts in the read-out address counter, i.e. when the number of counts $(X - 1)$ in the delay register and the number of counts y in the write-in address counter coincide with each other, such condition becomes $$y = A + (X - 1)$$

The number of vacant addresses Z in the buffer storage unit may be represented at any time by $$z = A - Y + X$$

Therefore, substituting $$y = A + (X - 1)$$
$$z = A - A + (X - 1) + X$$
$$* z = 1$$

In other words, the vacant-address number becomes one under the condition of coincidence between the number of counts in the write-in address counter and that in the delay register, which means that the buffer storage unit has all the information addresses except one subjected to write-in, with its memory being just before saturation. The time corrector 28 effects, upon application of a coincidence signal from the comparator 27 thereto, the time correction of the signal (herein, a delay is made by one writing-in period of time in order to effectively utilize one information address), and rejects an information input into the information input gate 6. This automatically prevents any faults due to the saturation of the buffer storage unit. When read-out of information is done and hence write-in of the same becomes possible, the information input gate 6 will immediately release the rejection of input information, so that the normal operation will be restored. These states may be easily monitored by an operator by means of the display device.

The display device 25 governs display of various states and control states owing to the automatic control unit 5. Briefly stated, it provides display of the control state by the automatic detection-reference controller 23, display of the interference state by the automatic interference-state selector 24, display of control states, display of the occurrence of any trouble in the related equipments, and other necessary displays.

Figure 8:
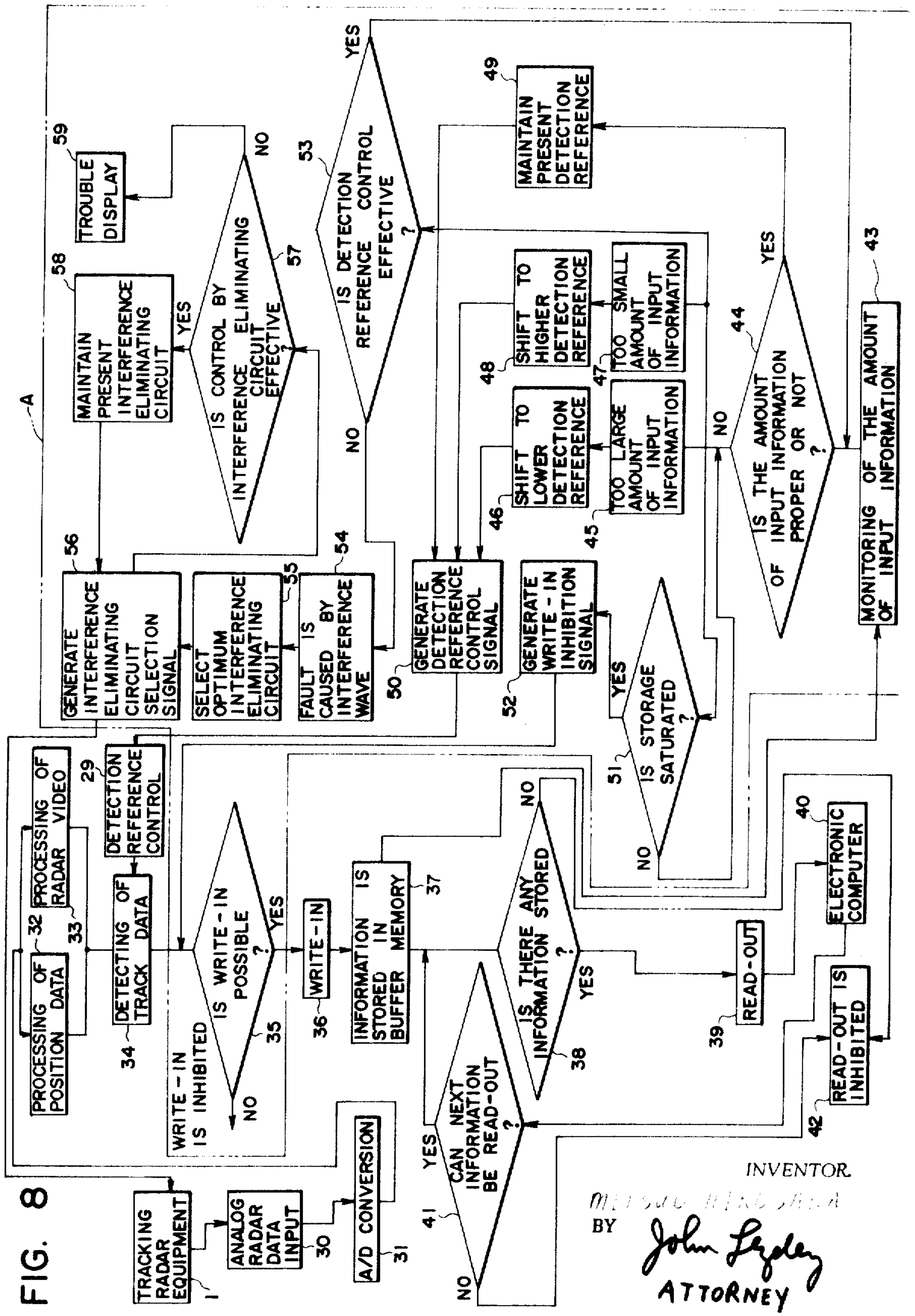
FIG. 8 is a flow chart useful for explaining the operation of the system shown in FIG. 7.

The flow chart of FIG. 8 shows the flow of concise operations for easily understanding the functions of the automatic control unit explained in 3.1 and shown in FIG. 7. It will now be described, with reference to FIG. 7. A (the part surrounded by chain lines) represents the flow of concise operations as to various functions of the automatic control unit according to the invention, while the remaining parts show the flow of the basic operations in the prior art information processing system.

First, there will be briefly described the functions of the prior art.

Analog radar information outputted from the radar equipment 1, such as radar video, position data and triggers are inputted through an input unit 30 to the A/D converting and radar information processing mechanism 2 in FIG. 7. Such analog information are converted at 31 into digital information. Then, the necessary position data 32 and the digital radar video 33 are processed to be supplied to the digital wake information processing and detecting mechanism 3 in FIG. 7.

The digital wake information processing and detecting mechanism 3 performs a processing 34 for establishing the supplied digital radar information (position data, radar video) as wake information, and detects among a number of radar information the possible wake information (hereinbelow termed the "pseudo wake-information") in accordance with the control of the detection-reference controller 29. The detected pseudo wake information are inputted to the buffer storage unit 4 in FIG. 7, and are subjected to write-in 36 to the memory. The wake information 37 written in by the devices 7, 8, 9 and 10 in FIG. 7 are stored and maintained until they are read out. Read-out of the information 39 stored in the memory 13 in FIG. 7 is instructed by the electronic computer 40. If there is the instructed information 41, it will be read out 38 and will be inputted to the electronic computer. The computer 40 effects the establishment of only the true wake information among the inputted pseudo wake-information; performs the automatic tracking of a wake, various computations or references or correlations or renewals or the like necessary for the automatic detection of a new wake; and provides the results for display, transmission, file and so on as may be needed.

Operations (A) of the various functions owing to the automatic control unit according to the invention as shown in FIG. 8, will be briefly stated.

Numerals 43 and 44 designate operations by the information input detecting function (the arrangement of 15 to 18 and 19 as well as 20 in FIG. 7); 45 to 50 operations by the automatic detection-reference controller (23 in FIG. 7); 51, 52 and 35 operations by the automatic memory control device (26 to 28 and 6 in FIG. 7), 53 to 58 operations by the automatic interference-eliminating circuit selector (24 in FIG. 7), and 59 an operation by the display (25 in FIG. 7). In brief, the information input quantity detecting function always monitors 43 the amount of stored information in the buffer storage unit to thereby inspect if the quantity of input information is optimum 44. The automatic detection-reference controller (23 in FIG. 7) puts into practice a variety of subsequent automatic controls dependent upon the results of the inspection. If the input quantity of wake information is excessive 45, it will be commanded to lower the detected amount of wake information 46. In accordance with the command, there is produced a detection-reference control signal for making smaller the present amount of pseudo-wake-information detection 50. This signal controls the operation of 34 through the detection-reference controller 29, thereby reducing the detection quantity of the pseudo wake-information. The state under which the detected quantity of the pseudo wake-information at 34 is lowered to make smaller the amount of input information in the buffer storage unit, is monitored at 43 and inspected at 44. These controls are repeated until the amount of input information becomes suitable through the inspection at 44. When the input quantity of information is judged to be suitable 44, a command will be given so as to maintain the present detection reference 49. Upon this command, the present detection-reference control signal at 50 is held, and the present detection reference at 34 is maintained through the controller 29.

When the amount of input information is determined to be too small 47, it will be commanded 50 to increase the detected wake information 48. Upon this command, 50 generates a detection-reference control signal for making larger the present detected amount of wake information at 34, and controls the wake information detection quantity at 34 through 29. These controls are repeatedly put into practice until the amount of input information in the buffer storage unit at 37 becomes a suitable one. If the amount becomes suitable, it will be determined optimal at 44 and the present wake detection reference at 34 will be maintained by the operations 49 and 50. These control functions, owing to the automatic detection-reference controller, control the input information quantity in order that the stored quantity of information in the buffer storage unit may lie between the prescribed upper-limit value ($\beta_1$) and lower-limit value ($\beta_2$) at any time. Such amount of input information becomes a quantity corresponding to the information read-out quantity of the electronic computer per unit time in the buffer storage unit. As a result, an information quantity corresponding to the processing capability of the electronic computer per unit time is supplied at any time.

When a state occurs under which the input information quantity in the buffer storage unit cannot be controlled (is no longer suitable) by the control functions 45 to 50 of the automatic detection-reference controller (23 in FIG. 7), then the operation 53 will judge that the control by means of the automatic detection-reference controller is impossible and such state will be determined to be a fault due to interference waves in the radar equipment 54. Upon the determination, a command is given in order to sequentially make selections of the interference eliminating circuits 55. The selection command provides control signals for selecting the interference eliminating circuits 56, thereby to sequentially select the circuits in the radar equipment 1. It is always monitored if the detecting condition of wake information has become normal through the selective use of the interference eliminating circuits 57. When the monitoring judges that the condition has become normal, maintenance of the particular interference-eliminating circuit will be determined 58 and use of the present interference-eliminating circuit in the radar equipment 1 will be continued. If the use of the progressively selected interference-eliminating circuits may not provide a normal quantity of information in the buffer storage unit, the particular state will be determined to come from any trouble of equipments in the related functions, and the display (25 in FIG. 7) will perform display with a trouble lamp, alarm with a buzzer, etc. 59.

The automatic memory control device (26 to 28 and 6 in FIG. 7) having independent control functions, always inspect whether or not the amount of stored information in the buffer storage unit is immediately before the point of saturation 51. If, on account of any abnormal phenomenon, an excessive amount of pseudo wakes is temporarily produced and a state immediately before saturation of the buffer storage unit occurs therewith, then such state will be instantly detected to provide a write-in rejecting signal 52. This write-in rejection signal rejects input of a wake information to-be-inputted 35. More specifically, input of the wake information detected at 34 and to be supplied to 36 for performance of write-in is rejected, so that saturation and duplicate write-in of information due thereto in the buffer storage unit are prevented from occurring. Instantly the immediately-before-saturation state in the buffer storage unit is removed (instantly at least two vacant addresses are provided after performance of information read-out by the electronic computer), the write-in rejecting signal disappears, whereby write-in of wake information from 34 to the buffer storage unit is performed at 36 through the operation 35 thus providing the normal operation of the system.

Figure 9A:
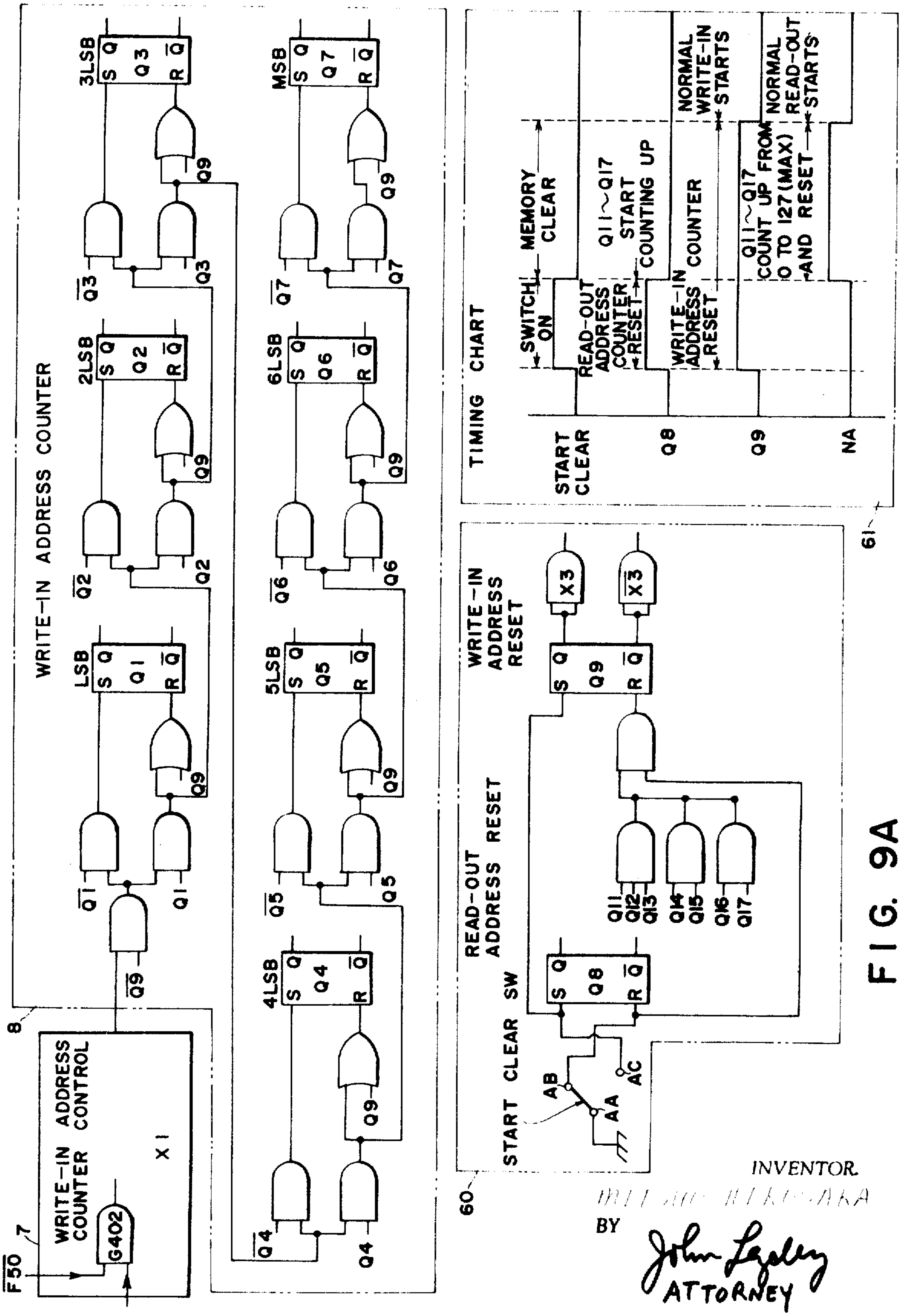
FIG. 9A is a diagram showing the construction arrangement and the operative timing of a write-in address counter shown in FIG. 7.
Figure 9B:
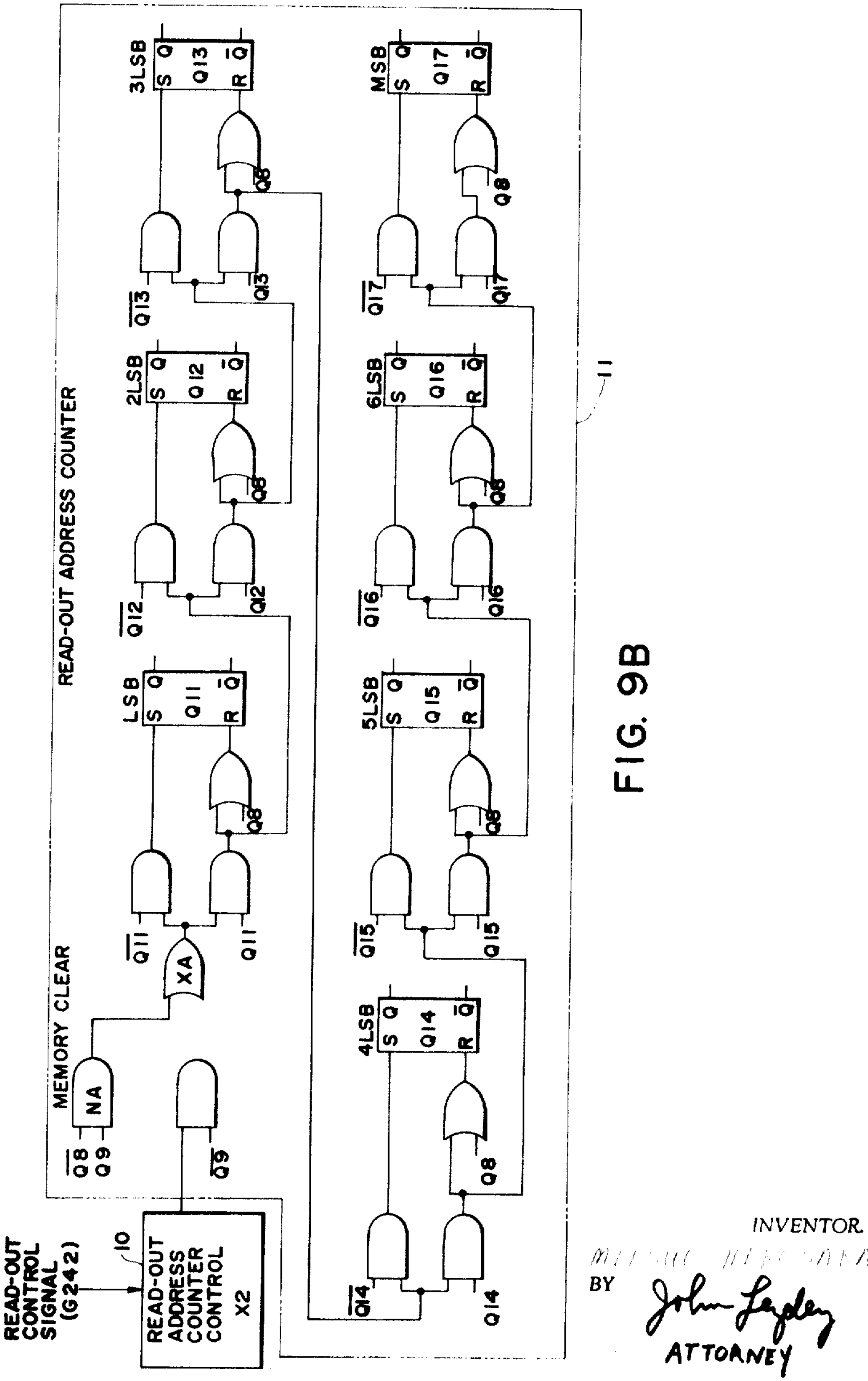
FIG. 9B shows the construction arrangement of a read-out address counter shown in FIG. 7.

4.0 Write-in and Read-out Address Counters, and Controls Therefor (FIGS. 9-1 and 9-2)

The usual write-in and read-out address counters in the buffer storage unit and controls therefor and related to the automatic control unit, so they will be described only briefly.

In FIG. 9-1, reference numeral 7 designates the write-in address counter controller, 8 the write-in address counter, and 60 and 61 a circuit arrangement for the reset controls of the write-in and read-out address counters and a reference timing chart for the circuit arrangement, respectively. in FIG. 9-2, reference numeral 10 designates the read-out address counter controller, while 11 the read-out address counter. In the description in this specification, the information storage capacity of the buffer is assumed to be 128 (Address 0 to Address 127).

Referring to FIG. 9-1, an output signal X1 from the write-in address counter controller 7 is a counter control signal (hereinafter termed "signal X1") for the write-in address counter, which signal is produced in said controller through an AND gate G402 at every input of a wake information when no write-in prohibition signal (Q50) is present or during normal operation of $\bar{Q}50$, and which signal remains "true" (= 1) for the period of one clock time. The write-in address counter 8 is a count-up counter of MOD128 (128 counts of Count 0 to Count 127) composed of flip-flops Q1 to Q7, and performs a count-up action sequentially at each input of the signal X1 in order to progressively write in the wake information inputted randomly in real time, to the buffer memory at every such input. The count outputs from the address counter specify sequentially the information write-in addresses in the memory through the address mechanism (9, FIG. 7). The operations of the write-in address counters Q1 to Q7 will now be described, using logical expressions. The set terminal input (hereinbelow called SQ1) of the flip-flop Q1 is represented by SQ1 = $X1\cdot\overline{Q1}\cdot\overline{Q9}$, while the reset terminal input (hereinafter termed RQ1) by RQ1 = $X1\cdot Q1\cdot\overline{Q9}+Q9$. More specifically, when Q1 is under the reset state during the normal operation (state $\overline{Q9}$), Q1 will be set upon application of the "true" level to the set terminal of Q1 through two AND gates by the signal X1. Whereas, when Q1 is under the set state, it will be reset upon application of the signal X1 (the "true" level) to the reset terminal. Therefore Q1 changes its state ("true" and "false") alternately each time the signal X1 is inputted, and thereby effects the counter action of the signal X1.

In the following, there are represented the operations of Q2 to Q7 using logic expressions.

$$\left[\begin{array}{l} SQ2 = X1\cdot\overline{Q9}\cdot Q1\cdot\overline{Q2} \\ RQ2 = X1\cdot\overline{Q9}\cdot Q1\cdot Q2 + Q9 \end{array}\right.$$

$$\left[\begin{array}{l} SQ3 = X1\cdot\overline{Q9}\cdot Q1\cdot Q2\cdot\overline{Q3} \\ RQ3 = X1\cdot\overline{Q9}\cdot Q1\cdot Q2\cdot Q3 + Q9 \end{array}\right.$$

$$\left[\begin{array}{l} SQ4 = X1\cdot\overline{Q9}\cdot Q1\cdot Q2\cdot Q3\cdot\overline{Q4} \\ RQ4 = X1\cdot\overline{Q9}\cdot Q1\cdot Q2\cdot Q3\cdot Q4 + Q9 \end{array}\right.$$

$$\left[\begin{array}{l} SQ5 = X1\cdot\overline{Q9}\cdot Q1\cdot Q2\cdot Q3\cdot Q4\cdot\overline{Q5} \\ RQ5 = X1\cdot\overline{Q9}\cdot Q1\cdot Q2\cdot Q3\cdot Q4\cdot Q5 + Q9 \end{array}\right.$$

$$\left[\begin{array}{l} SQ6 = X1\cdot\overline{Q9}\cdot Q1\cdot Q2\cdot Q3\cdot Q4\cdot Q5\cdot\overline{Q6} \\ RQ6 = X1\cdot\overline{Q9}\cdot Q1\cdot Q2\cdot Q3\cdot Q4\cdot Q5\cdot Q6 + A9 \end{array}\right.$$

$$\left[\begin{array}{l} SQ7 = X1\cdot\overline{Q9}\cdot Q1\cdot Q2\cdot Q3\cdot Q4\cdot Q5\cdot Q6\cdot\overline{Q7} \\ RQ7 = X1\cdot\overline{Q9}\cdot Q1\cdot Q2\cdot Q3\cdot Q4\cdot Q5\cdot Q6\cdot Q7 + Q9 \end{array}\right.$$

Q9 resets, when the system is actuated (by pressing a start clear switch), all the flip-flops of Q1 to Q7 by means of a clear signal thereby to forcibly set them at Count 0 (zero). The flip-flops Q1 to Q7 are count-up counters of MOD128 which start normal operations simultaneously when Q9 falls into the reset state ($\overline{Q9}$) and which count up every count each time the signal X1 is inputted, thus repeatedly counting from Count 0 (zero) till the maximum Count 127. The states of the count-up actions are shown in the reference timing chart (X1, Q1 – Q7) of FIG. 13.

Referring to FIG. 9-1, Q8 and Q9 in 60 govern a control for simultaneously starting the write-in and read-out address counters from Count 0 (zero) when the system is actuated.

When the start clear switch is pressed pursuant to the actuation of the system, the terminal AC of the start clear switch will become at the "true (= 1)" level, which is applied to the set terminals of Q8 and Q9 to set them, and the respective outputs thereof reset the write-in and read-out address counters. When the start clear switch is thrown back (to the position of terminal AB), the terminal AB will become at the "true" level, which is applied to the reset terminal of Q8 to immediately reset it. Q9 is reset at the same time as the read-out address counter reaches the maximum number of counts, i.e. Count 127. When Q9 is reset, the normal operations of the write-in and read-out address counters or the normal operation of the system will be started.

These operations are now be represented by logic expressions, and will be described with reference to the timing chart 61.

$$\left[\begin{array}{l} SQ8 = \mathrm{START}\cdot SW\cdot ON(AC) \\ RQ8 = \mathrm{START}\cdot SW\cdot OFF(AB) \end{array}\right.$$

$$\left[\begin{array}{l} SQ9 = \mathrm{START}\cdot SW\cdot ON(AC) \\ RQ9 = \mathrm{START}\cdot SW\cdot OFF(AB) \end{array}\right.$$

$$Q11\cdot Q12\cdot Q13\cdot Q14\cdot Q15\cdot Q16\cdot Q17$$

$$\left[\begin{array}{l} X3 = Q9 \\ \overline{X3} = \overline{Q9} \end{array}\right.$$

$$NA = \overline{Q8}\cdot Q9 \text{ (Fig. 9–2)}$$

At the same time as the start clear switch is thrown ON (the terminal AC), the flip-flops Q8 and Q9 are set, whereby Q8 resets the read-out address counter (FIG. 9-2) while Q9 resets the write-in address counter. While Q9 remains set, the input of Signal X1 to the write-in address counter and the input of Signal X2 to the read-out address counter are rejected, so that the normal counting actions of the respective address counters by the signals X1 and X2 are prohibited. Simultaneously when the start clear switch is thrown back to the normal position (OFF=AB), Q8 will be reset, the read-out address counter will begin counting through the control of NA=$\overline{Q8}$·Q9, and the unnecessary information in the memory will be read out. The counting is performed from Count "0" (zero) to the maximum Count "127," and all the information in the memory are read out. When the read-out address counter reaches Count 127 (all the flip-flops Q11 to Q17 are "true" ($\overline{Q9}$) while Q9 remains reset and indicating the period of normal operation, and governs controls at the start clear in various parts of the automatic control unit.

In FIG. 9-2, the read-out address counter control signal X2 (hereinbelow termed "Signal X2") outputted from the read-out address counter controller 10 is a control signal which is produced at every request of the electronic computer for read-out and which remains "true" (= 1) for one clock time. The read-out address counter 11 comprises flip-flops Q11 to Q17, and is a count-up counter of MOD128 similar to the write-in address counter. It effects the count-up actions sequentially each time the signal X2 is inputted, in order to progressively read out information in the buffer storage unit in response to the instructions of read-out from the electronic computer. The count outputs from this address counter sequentially specify information read-out addresses in the memory through the address mechanism (9 in FIG. 7). In the following, there are represented by logic expressions the operations of the flip-flops Q11 to Q17 in the read-out address counter:

$$XA = \overline{Q9}\cdot X2 + NA$$

$$NA = Q9\cdot\overline{Q8}$$

$$\left[\begin{array}{l} SQ11 = XA\cdot\overline{Q11} \\ RQ11 = XA\cdot Q11 + Q8 \end{array}\right.$$

$$\left[\begin{array}{l} SQ12 = XA\cdot Q11\cdot\overline{Q12} \\ RQ12 = XA\cdot Q11\cdot Q12 + Q8 \end{array}\right.$$

$$\left[\begin{array}{l} SQ13 = XA\cdot Q11\cdot Q12\cdot\overline{Q13} \\ RQ13 = XA\cdot Q11\cdot Q12\cdot Q13 + Q8 \end{array}\right.$$

$$\left[\begin{array}{l} SQ14 = XA\cdot Q11\cdot Q12\cdot Q13\cdot Q14 \\ RQ14 = XA\cdot Q11\cdot Q12\cdot Q13\cdot Q14 + Q8 \end{array}\right.$$

$$\left[\begin{array}{l} SQ15 = XA\cdot Q11\cdot Q12\cdot Q13\cdot Q14\cdot\overline{Q15} \\ RQ15 = XA\cdot Q11\cdot Q12\cdot Q13\cdot Q14\cdot Q15 + Q8 \end{array}\right.$$

$$\left[\begin{array}{l} SQ16 = XA\cdot Q11\cdot Q12\cdot Q13\cdot Q14\cdot Q15\cdot Q16 \\ RQ16 = XA\cdot Q11\cdot Q12\cdot Q13\cdot Q14\cdot Q15\cdot Q16 + Q8 \end{array}\right.$$

$$\left[\begin{array}{l} SQ17 = XA\cdot Q11\cdot Q12\cdot Q13\cdot Q14\cdot Q15\cdot Q16\cdot\overline{Q17} \\ RQ17 = XA\cdot Q11\cdot Q12\cdot Q13\cdot Q14\cdot Q15\cdot Q16\cdot Q17 + Q8 \end{array}\right.$$

In the expression XA = $\overline{Q9}$ X2+NA, the term $\overline{Q9}$·X2 indicates that the sequential count-up actions are performed by ($\overline{Q9}$)X2 during the period other than the start clear or during the period of the normal operation, while the term NA = Q9·$\overline{Q8}$ indicates the operation of controlling the counting action from count 0 (zero) to the maximum Count 127 at the start clear, thereby reading out all the unnecessary information in the memory in order to make the memory vacant. Q8 applied in +(OR) to the reset terminals of the respective flip-flops, resets all the flip-flops of Q11 to Q17 at the start clear, thereby forcibly setting them at Count 0 (zero). Simultaneously with the starting of the normal operation (the state of $\overline{Q9}$), the read-out address counters Q11 to Q17 are controlled by the signal X2 and carry out the progressive count-up actions.

Figure 13:
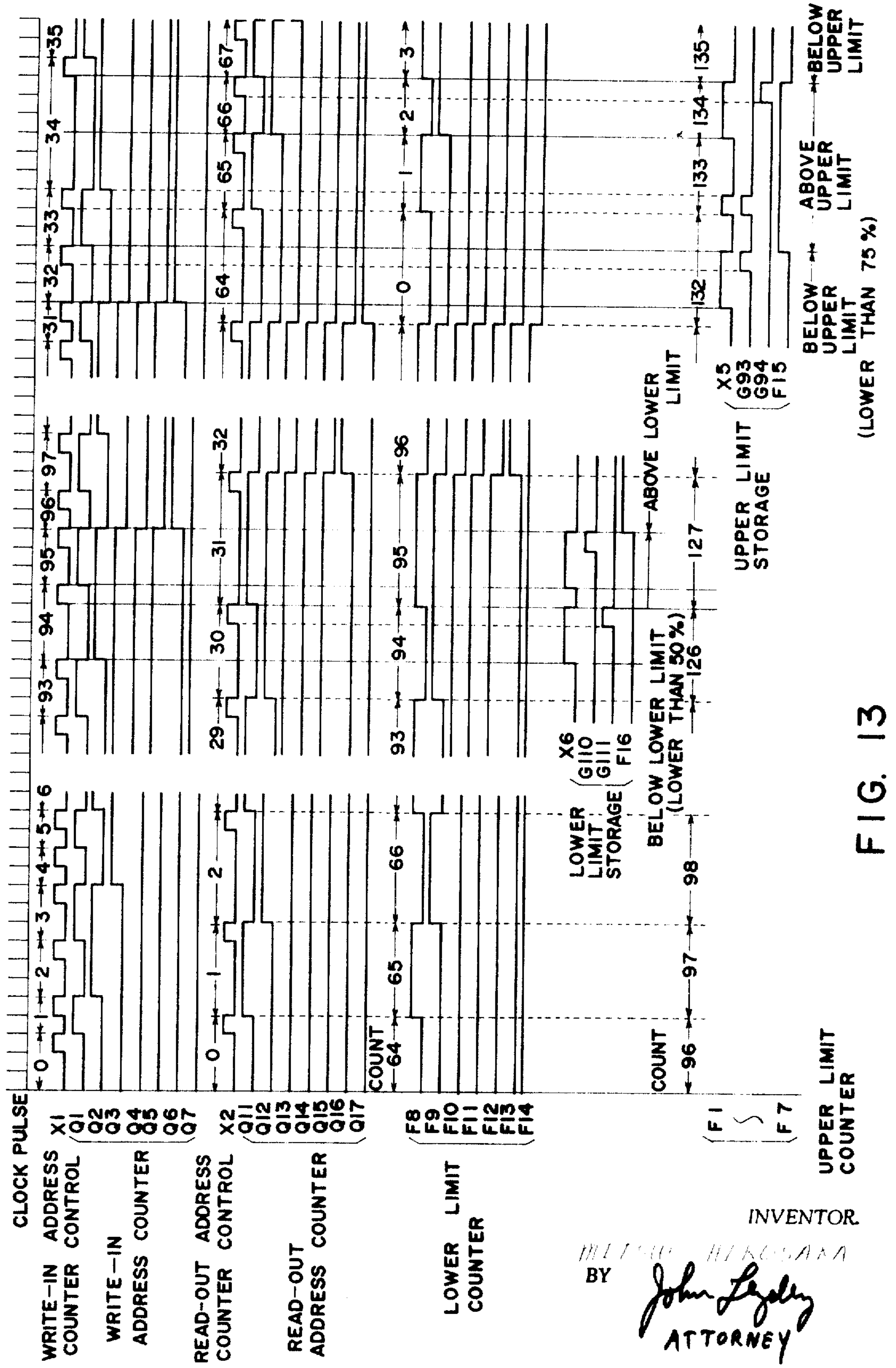
FIG. 13 is a timing chart illustrating the operating states of the devices shown in FIGS. 9 to 12.

These operative states are shown in FIG. 13 (X2, Q11 to Q17).

5.0 Automatic Control Unit (FIGS. 10 to 21)

Referring to FIGS. 10 to 21, the automatic control unit according to the invention will now be described in detail.

Figure 14:
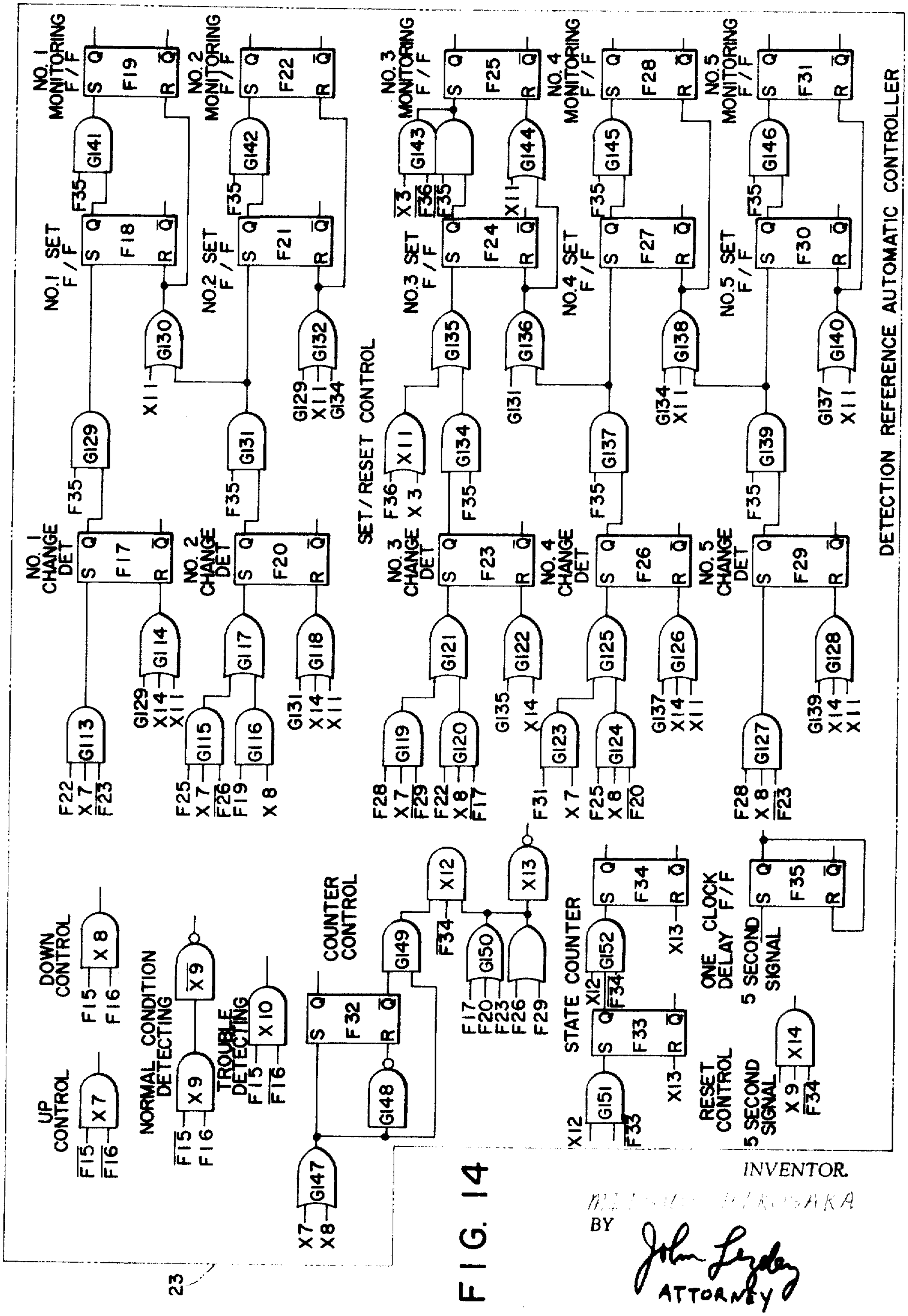
FIGS. 14 and 15 show an automatic detection-reference controller.
Figure 15:
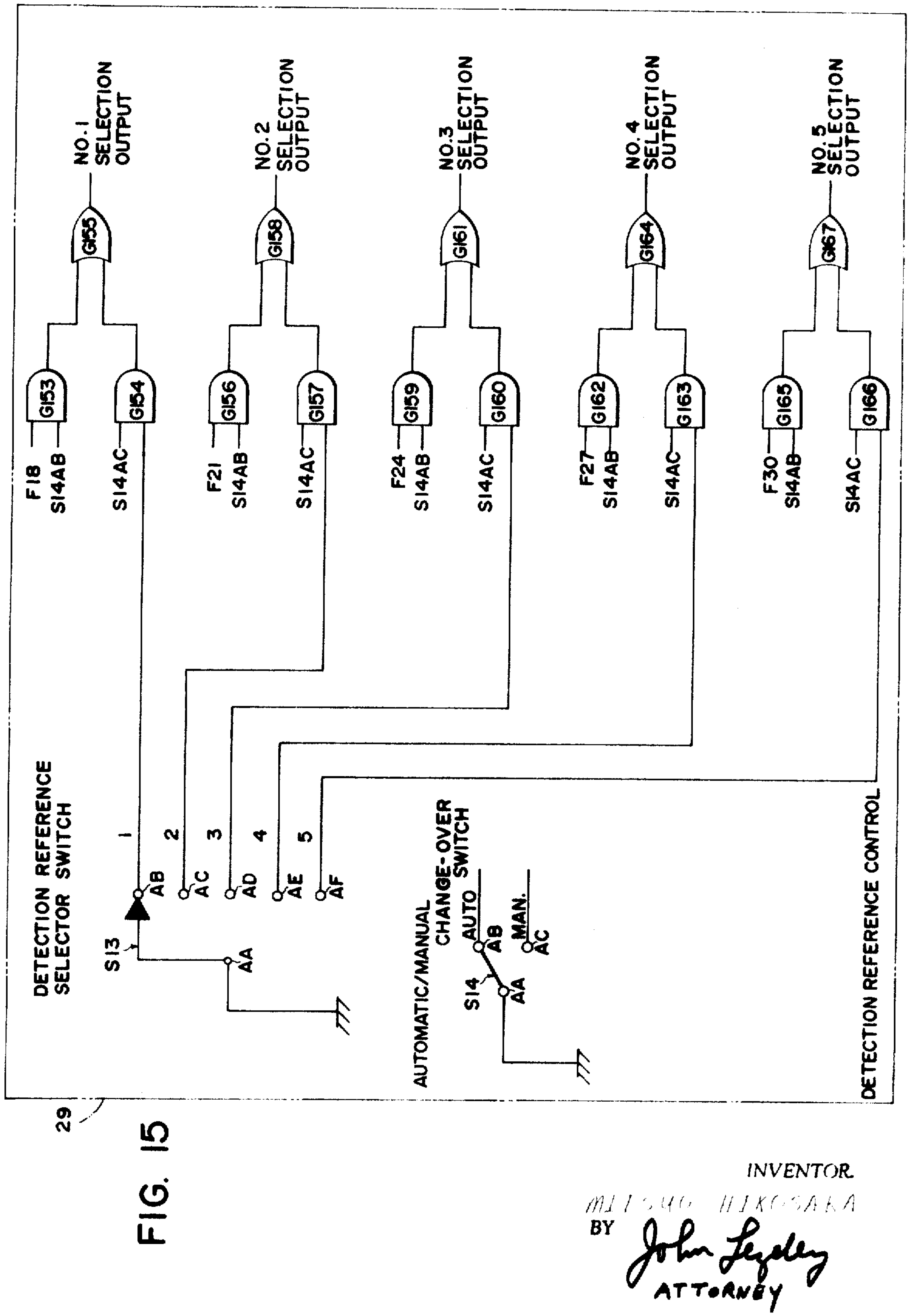
Figure 16:
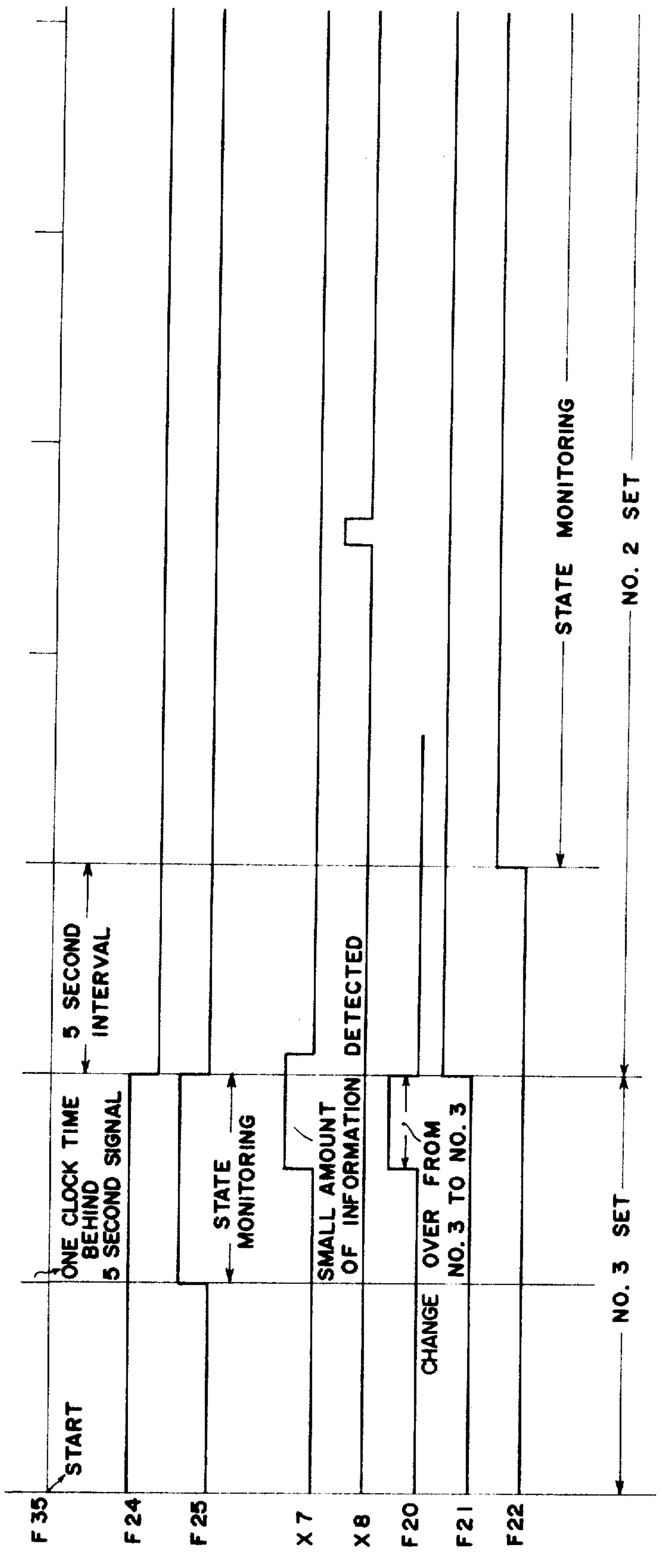
FIG. 16 is a timing chart useful for explaining the operation of the automatic detection-reference controller shown in FIGS. 14 and 15.
Figure 17:
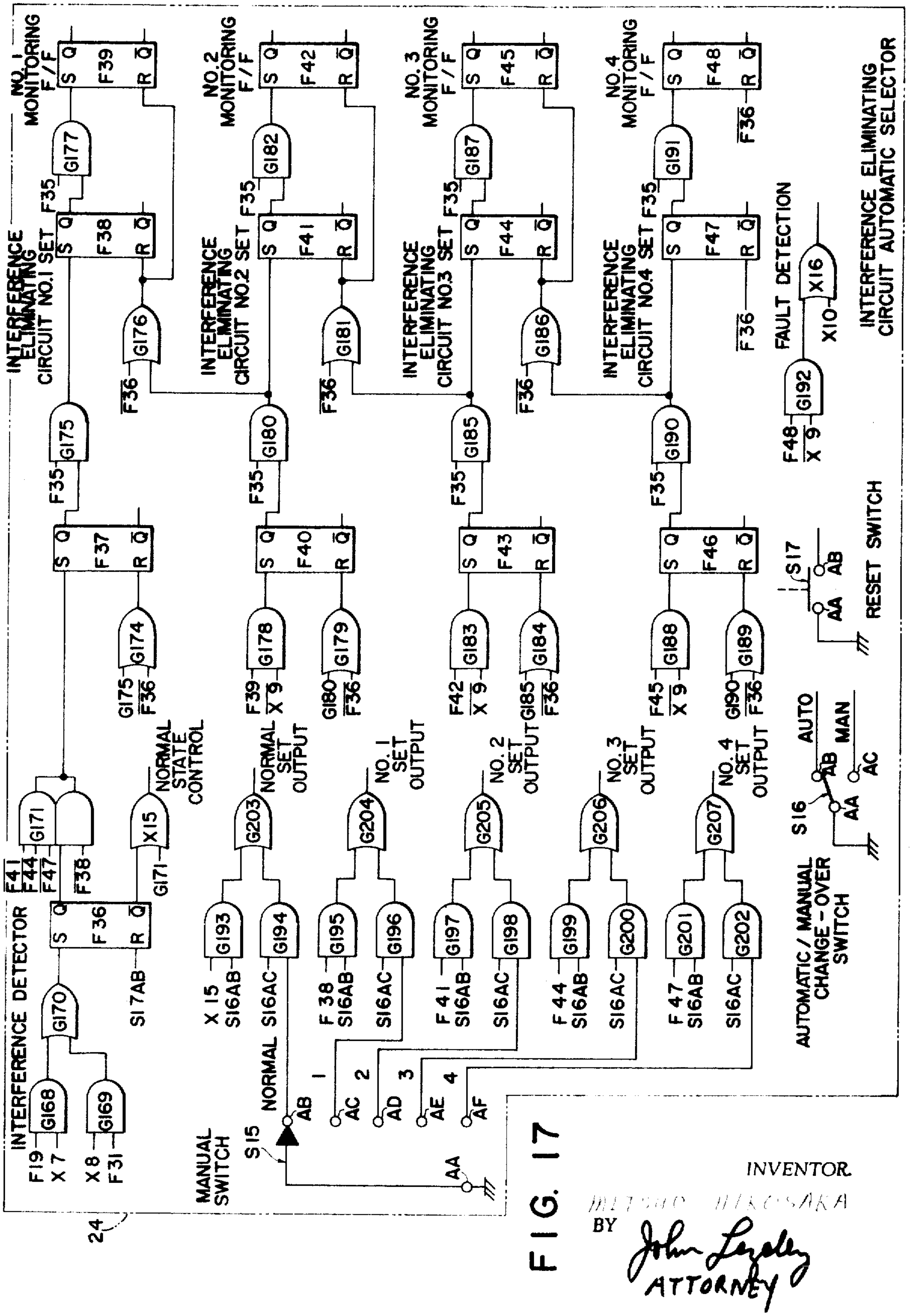
FIG. 17 is a diagram showing an automatic selector for interference eliminating circuits.
Figure 18:
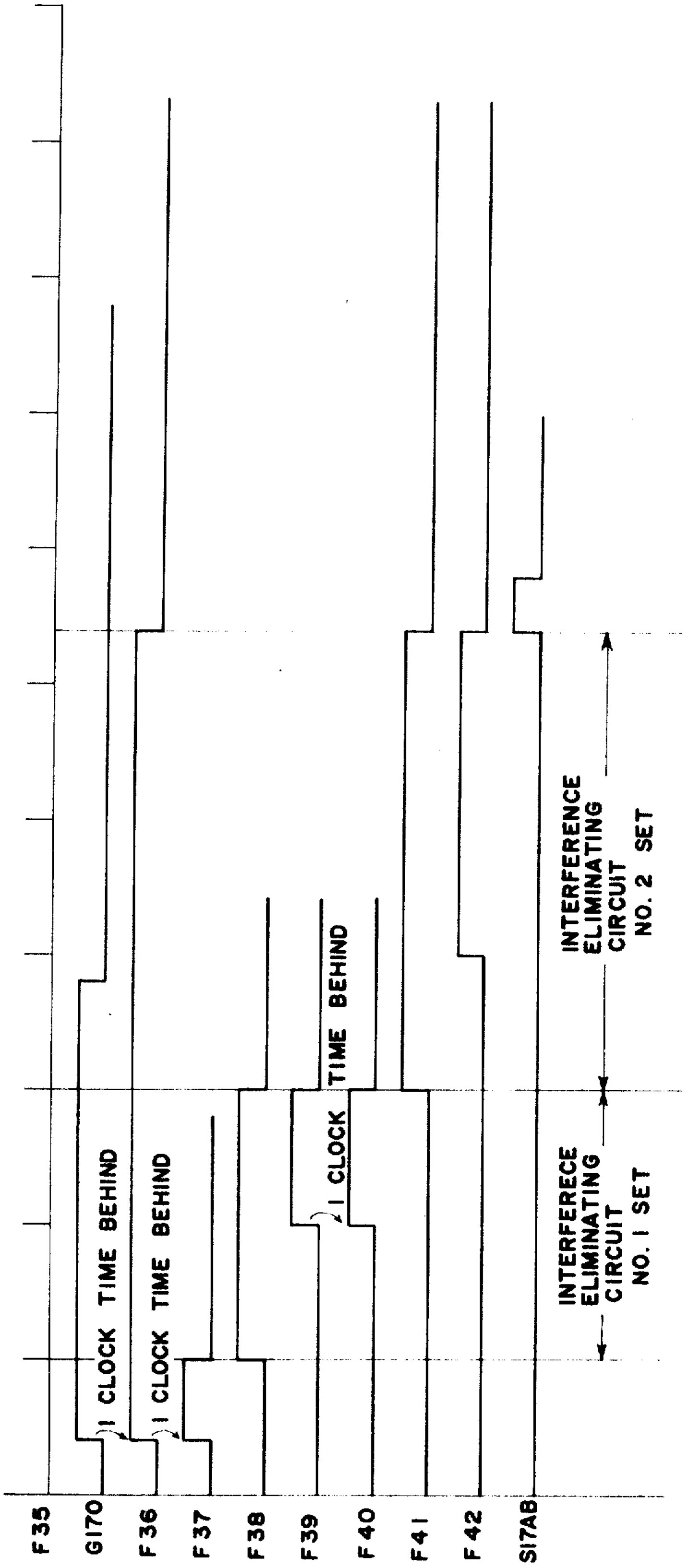
FIG. 18 is a chart showing the operative timing of the automatic interference-eliminating circuit selector illustrated in FIG. 17.
Figure 19:
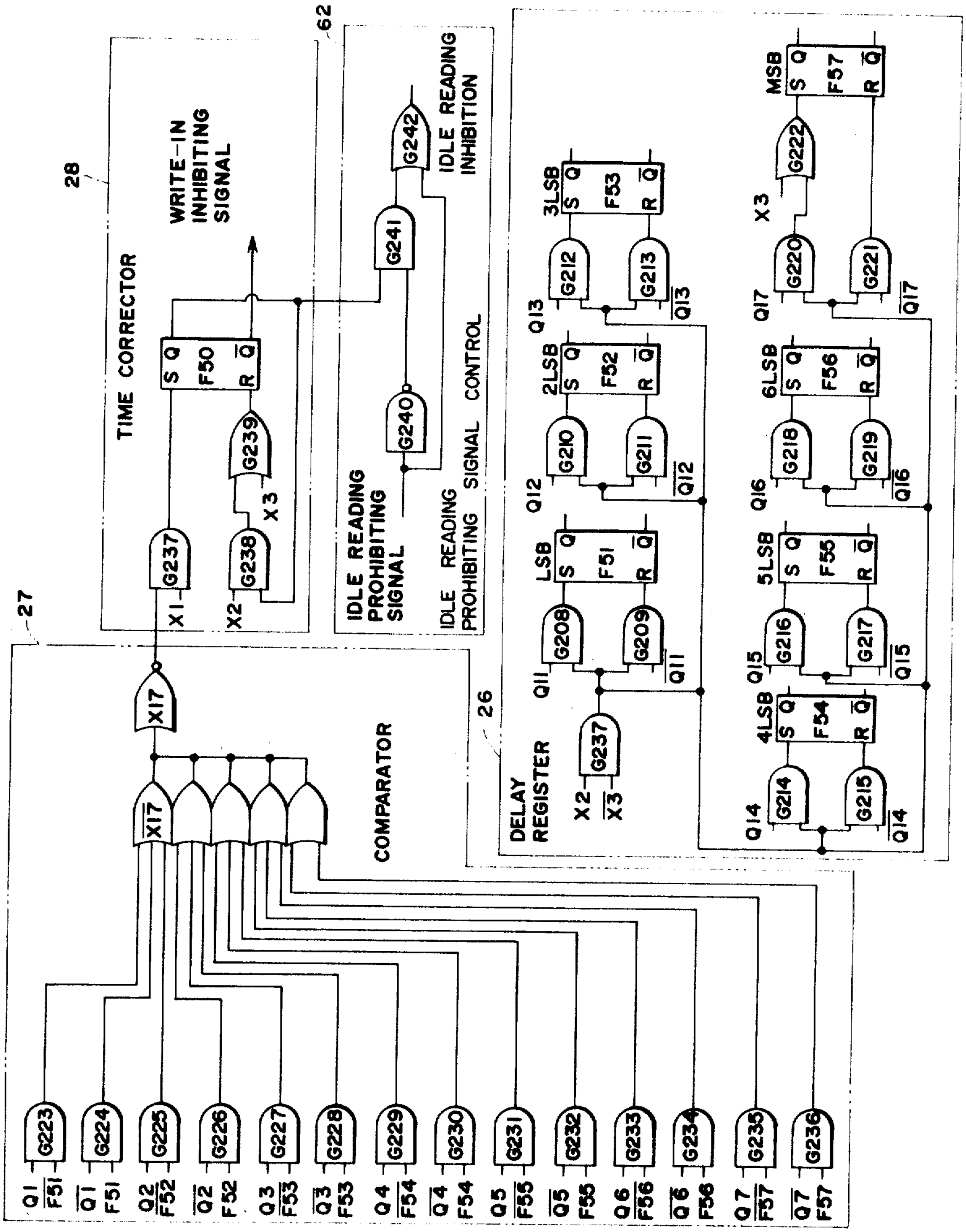
FIG. 19 shows an automatic memory control shown in FIG. 7.
Figure 20:
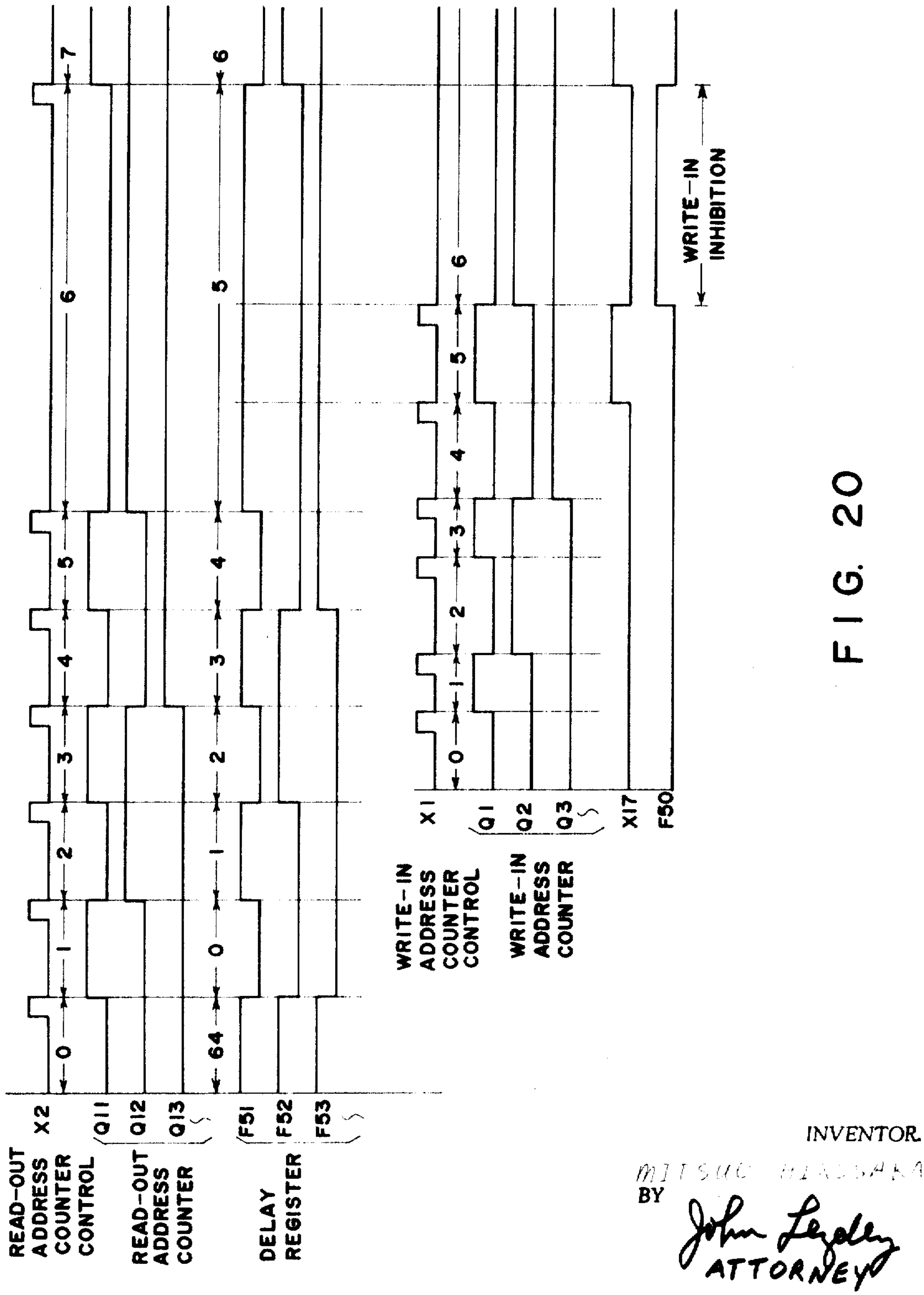
FIG. 20 is a timing chart illustrating the operation of the automatic memory control shown in FIG. 19.
Figure 21:
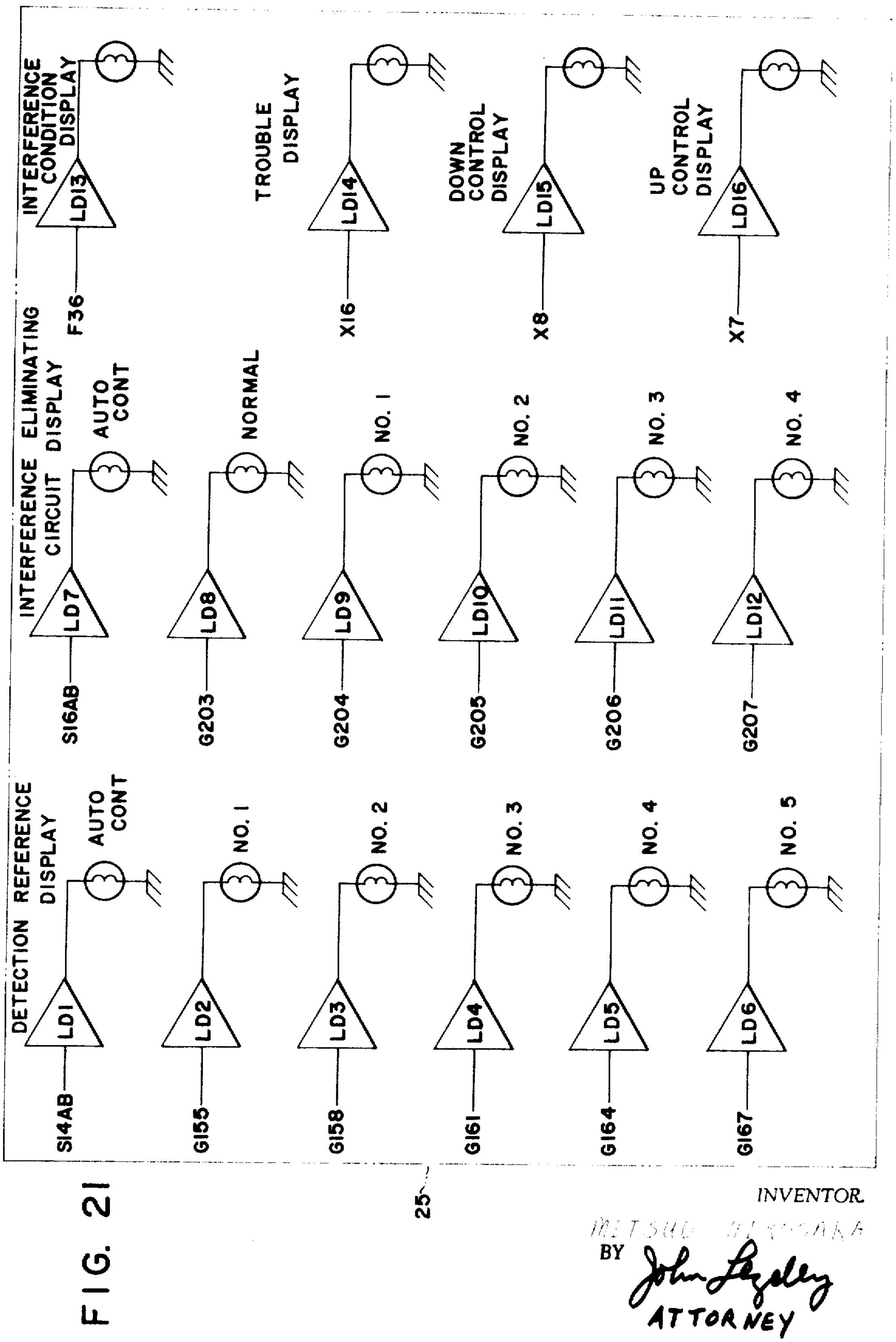
FIG. 21 illustrates state display devices shown in FIG. 7.

Among the functions and devices constituting the automatic control unit, the function of detecting the quantity of information inputted to the buffer storage unit, which function constitutes the automatic control unit, will be stated in Section 5.1 with reference to FIGS. 10 to 13; the automatic detection-reference control function in Section 5.2 with reference to FIGS. 14 to 16; the automatic interference-eliminating circuit selecting function in Section 5.3 with reference to FIGS. 17 and 18; the automatic memory control device in Section 5.4 with reference to FIGS. 19 and 20; and the display device in Section 5.5 with reference to FIG. 21; respectively.

Figure 10:
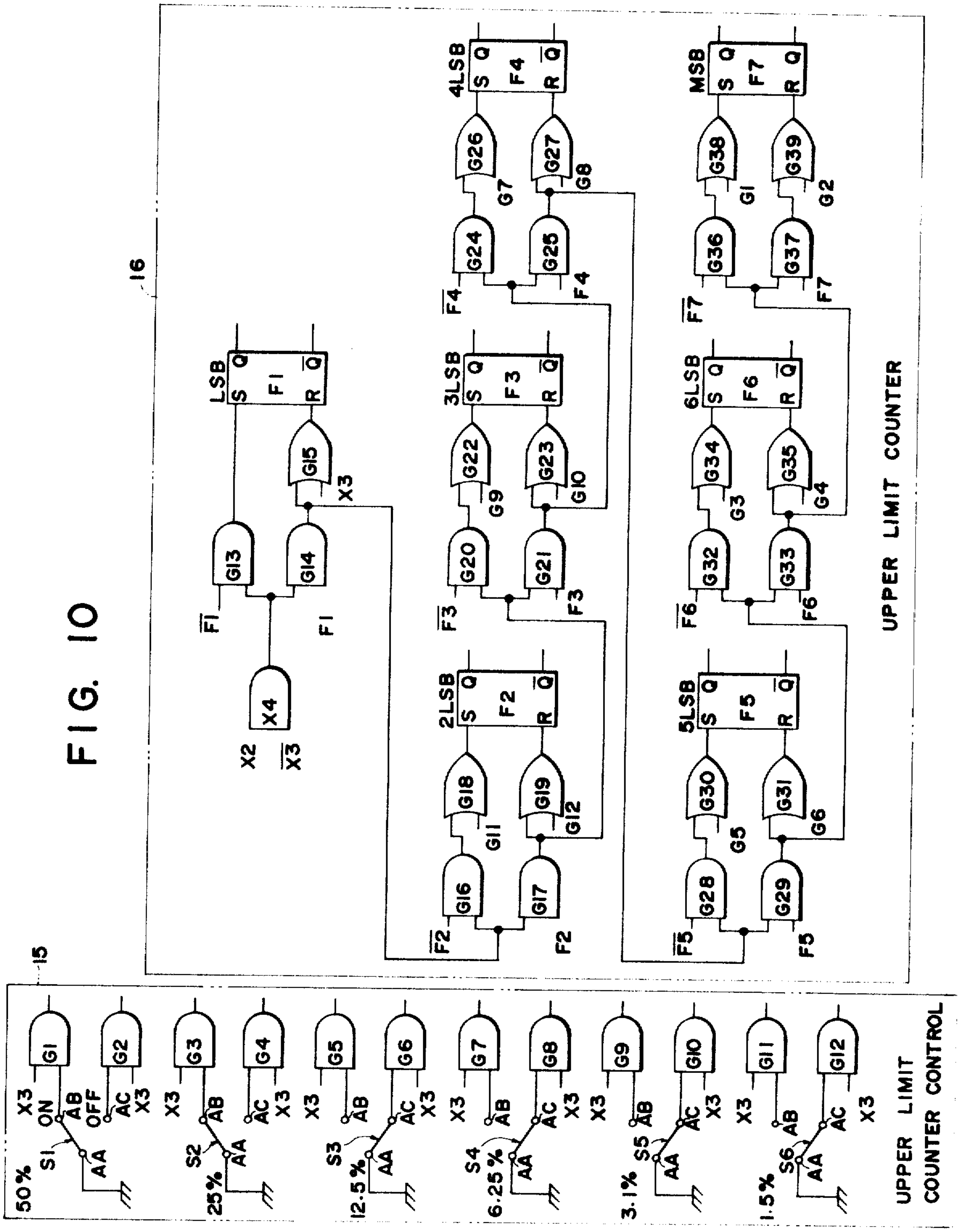
FIG. 10 shows an upper-limit counter control and an upper-limit counter shown in FIG. 7.
Figure 11:
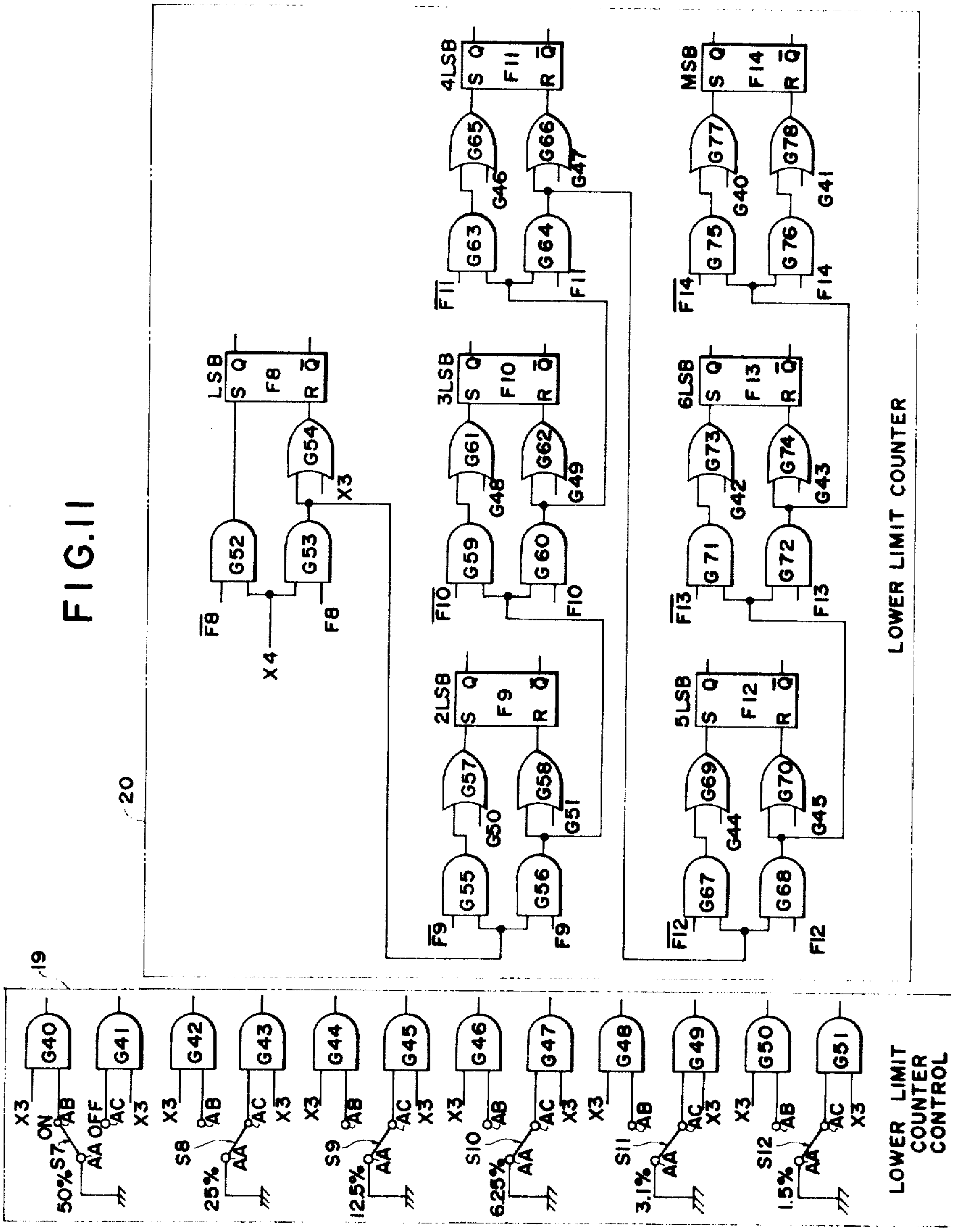
FIG. 11 illustrates a lower-limit counter control and a lower-limit counter shown in FIG. 7.
Figure 12:
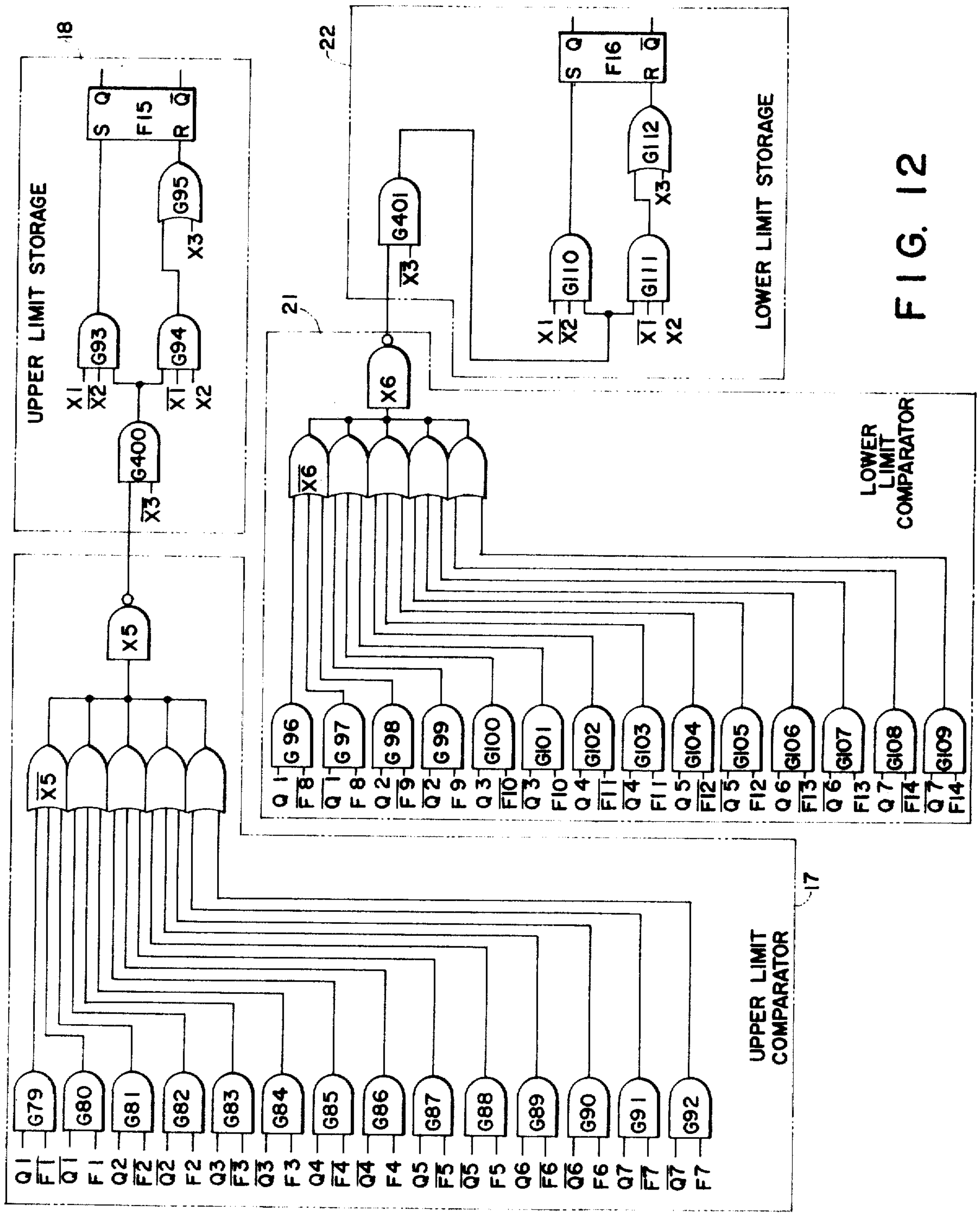
FIG. 12 shows an upper-limit comparator and an upper-limit storage; a lower-limit comparator and a lower-limit storage shown in FIG. 7.

Among the devices to provide the function of detecting the quantity of input information, the upper-limit counter control and the upper-limit counter are shown in FIG. 10; the lower-limit counter control and the lower-limit counter in FIG. 11; and the upper-limit comparator as well as the upper-limit storage and the lower-limit comparator as well as the lower-limit storage in FIG. 12; respectively. FIG. 13 is a reference timing chart showing the operative states of these devices.

Referring to FIG. 10, the upper-limit counter control 15 governs the control of setting the numberof start counts ($A\beta_1$) at the upper-limit counter 16 when starting.

The respective outputs from AND gates ($G_1$ to $G_{12}$) in the upper-limit counter control 15 are applied through OR gates ($G_{18}$ to $G_{39}$) to the set terminals or reset terminals of the respective flip-flops ($F_1$ to $F_7$) of the corresponding upper-limit counter (16), whereby they forcibly set the number of counts ($A\beta_1$) at the start clear (refer to X3 = Q9 in FIG. 9-1) by setting the switches S1 to S6. The AND gates of the upper-limit counter control have their operations determined by the positions (ON, OFF) of the switches S1 to S6. The operations are represented by logic expressions in the following:

G1 = X3·S1AB
G2 = X3·S1AC
G3 = X3·S2AB
G4 = X3·S2AC
G5 = X3·S3AB
G6 = X3·S3AC
G7 = X3·S4AB
G8 = X3·S4AC
G9 = X3·S5AB
G10 = X3·S5AC
G11 = X3·S6AB
G12 = X3·S6AC

G1 will now be explained. When S1 is thrown to the ON position (S1AB) to render the terminal AB "true" (= 1) in level, X3 will be outputted to the output terminal of G1, thereby to forcibly set F7 in order to set a count number equivalent to 50 percent of the total number of counts (A) in the upper-limit counter 16, at the upper-limit counter 16 at the time of start clear (the period of X3). When S1 is thrown to the OFF position (S1AC), the terminal AB will become "false" (= 0) in level, thus prohibiting X3 from being outputted. Among further gates G2 to G12 and dependent upon the set positions of the respective corresponding switches, G2 performs the control of resetting 50 percent of the total number of counts (A×0.5) at the upper-limit counter at the start clear (the period of X3); G3 setting 25% of the total number of counts; G4 resetting 25 percent of the total number of counts; G5 setting 12.5 percent of the total number of counts; G6 resetting 12.5 percent of the total number of counts; G7 setting 6.25 percent of the total number of counts; G8 resetting 6.25 percent of the total number of counts; G9 setting 3.1 percent of the total number of counts; G10 resetting 3.1 percent of the total number of counts; G11 setting 1.5 percent of the total number of counts; and G12 resetting 1.5 percent of the total number of counts; respectively. The upper-limit counter 16 is a count-up counter of MOD128 as composed of the flip-flops F1 to F7, and effects progressively a count-up action every time the signal X2 is inputted (X4 = X2·$\overline{X3}$) during the normal operation (refer to $\overline{X3}$ = $\overline{Q9}$ in FIG. 9-1). The count-up actions are carried out in synchronism with the read-out address counter (refer to FIG. 9-2). Only one point of difference from the read-out address counter is that the count-up action is started from the number of counts ($A\beta_1$) which is forcibly set by the upper-limit counter control 15 at the starting (the period of X3). The operations of the upper-limit counter F1 to F7 are represented hereunder by logic expressions. (The set input of the flip-flop F1 is shown by SF1, while the reset input by RF1. Similar expressions apply also to the flip-flops F2 to F7.)

$$X4 = X2\cdot\overline{X3}$$

$$\begin{cases} SF1 = X4\cdot\overline{F1} \\ RF1 = X4\cdot F1 + X3 \end{cases}$$

$$\begin{cases} SF2 = X4\cdot F1\cdot\overline{F2} + G11 \\ RF2 = X4\cdot F1\cdot F2 + G12 \end{cases}$$

$$\begin{cases} SF3 = X4\cdot F1\cdot F2\cdot\overline{F3} + G9 \\ RF3 = X4\cdot F1\cdot F2\cdot F3 + G10 \end{cases}$$

$$\begin{cases} SF4 = X4\cdot F1\cdot F2\cdot F3\cdot\overline{F4} + G7 \\ RF4 = X4\cdot F1\cdot F2\cdot F3\cdot F4 + G8 \end{cases}$$

$$\begin{cases} SF5 = X4\cdot F1\cdot F2\cdot F3\cdot F4\cdot\overline{F5} + G5 \\ RF5 = X4\cdot F1\cdot F2\cdot F3\cdot F4\cdot F5 + G6 \end{cases}$$

$$\begin{cases} SF6 = X4\cdot F1\cdot F2\cdot F3\cdot F4\cdot F5\cdot\overline{F6} + G3 \\ RF6 = X4\cdot F1\cdot F2\cdot F3\cdot F4\cdot F5\cdot F6 + G4 \end{cases}$$

$$\begin{cases} SF7 = X4\cdot F1\cdot F2\cdot F3\cdot F4\cdot F5\cdot F6\cdot\overline{F7} + G1 \\ RF7 = X4\cdot F1\cdot F2\cdot F3\cdot F4\cdot F5\cdot F6\cdot F7 + G2 \end{cases}$$

As understood from these logic expressions, the flip-flops F1 to F7 are forcibly set with the start number of counts ($A\beta_1$) through controls of G1 to G12 at the time of start clear (the period of $\overline{X3}$), and are caused to perform the sequential count-up actions upon starting of the normal operation (the period of X3) and through control of X4 or the signal X2 (X4 = X2·$\overline{X3}$). In the upper-limit counter control 15 shown in FIG. 10, when S1 and S2 are thrown to the ON positions while S3 to S6 to the OFF POSITIONS, THE OUTPUT TERMINALS OF G1, G3 and G6, G8, G10, G12 become "true" (= 1) in level while those of G2, G4, G5, G7, G9, G11 "false" (= 0), at the start clear (the period of X3). Thus, F1 of the upper-limit counter is reset by X3; F2 by G12; F3 by G10; F4 by G8; and F5 by G6, whereas F6 is set by G3 and F7 by G1. In other words, with F6 as well as F7 being brought to the set state and with F1 to F5 to the reset state, the number of start counts 96 ($A\beta_1$ = 128 × 0.75) is forcibly set. The start numberof counts 96 ($A\beta_1$) is 75 percent ($\beta_1$) on the basis of the total number of counts 128 (A), and it means that the forcible set has been attained by S1 (50 percent) ON and S2 (25 percent) ON. Upon completion of the start clear operation (the period of X3) and starting of the normal operation (the period of $\overline{X3}$), $\overline{X3}$ at one input terminal of an AND gate X4 becomes at the "true" (= 1) level and thus the output of X5 becomes "true" in level each time Signal X2 is inputted. The X4 outputs are applied through AND gates to the set terminals or reset terminals of the respective flip-flops F1 to F7, causing them to effect the set or reset actions thereby permitting them to carry out the sequential count-up. Therefore, the upper-limit counter composed of F1 to F7 progressively performs, upon starting of the normal operation, the count-up action at each count from the start number of counts ($A\beta_1$) through control of the signal X2 ($X4 = X2 \cdot \overline{X3}$).

That is, the number of counts ($\beta_1$) in the upper-limit counter is represented by the following formula at any time:

$$B_1 = A\beta_1 + x$$

($x$ = the number of the read-out address counts)

$$* \; B_1 = 128 \times 0.75 + x$$
$$= 96 + x$$

The states of the count-up actions of the upper-limit counter are shown in the reference timing chart (F1 to F7) of FIG. 13.

Referring to FIG. 11, the lower-limit counter control 19 has similar functions to those of the upper-limit counter control (15 in FIG. 10), and governs a control for setting the number of start counts ($A\beta_2$) at the starting of the lower-limit counter 20.

The operations represented by logic expressions are as follows:

| | |
|---|---|
| G40 = X3 · S7AB | (50% set) |
| G41 = X3 · S7AC | (50% reset) |
| G42 = X3 · S8AB | (25% set) |
| G43 = X3 · S8AC | (25% reset) |
| G44 = X3 · S9AB | (12.5% set) |
| G45 = X3 · S9AC | (12.5% reset) |
| G46 = X3 · S10AB | (6.25% set) |
| G47 = X3 · S10AC | (6.25% reset) |
| G48 = X3 · S11AB | (3.1% set) |
| G49 = X3 · S11AC | (3.1% reset) |

The lower-limit counter 20 is a count-up counter of MOD128 having quite the same functions as the upper-limit counter (16 in Fig. 10) and being composed of flip-flops F8 to F14. It is forcibly set with the start number of counts ($A\beta_2$) through control of the lower-limit counter control at the time of start clear (the period of X3), while it is counted up from the start number of counts ($A\beta_2$) through control of X4 ($X4 = X2 \cdot \overline{X3}$) upon starting of the normal operation (the period of $\overline{X3}$).

The operations of the lower-limit counter F8 to F14 are represented by the following logic expressions:

$$\begin{bmatrix} SF\,8 = X4 \cdot \overline{F8} \\ RF\,8 = X4 \cdot F8 + X3 \end{bmatrix}$$

$$\begin{bmatrix} SF\,9 = X4 \cdot F8 \cdot \overline{F9} + G50 \\ RF\,9 = X4 \cdot F8 \cdot F9 + G51 \end{bmatrix}$$

$$\begin{bmatrix} SF10 = X4 \cdot F8 \cdot F9 \cdot \overline{F10} + G48 \\ RF10 = X4 \cdot F8 \cdot F9 \cdot F10 + G49 \end{bmatrix}$$

$$\begin{bmatrix} SF11 = X4 \cdot F8 \cdot F9 \cdot F10 \cdot \overline{F11} + G46 \\ RF11 = X4 \cdot F8 \cdot F9 \cdot F10 \cdot F11 + G47 \end{bmatrix}$$

$$\begin{bmatrix} SF12 = X4 \cdot F8 \cdot F9 \cdot F10 \cdot F11 \cdot \overline{F12} + G44 \\ RF12 = X4 \cdot F8 \cdot F9 \cdot F10 \cdot F11 \cdot F12 + G45 \end{bmatrix}$$

$$\begin{bmatrix} SF13 = X4 \cdot F8 \cdot F9 \cdot F10 \cdot F11 \cdot F12 \cdot \overline{F13} + G42 \\ RF13 = X4 \cdot F8 \cdot F9 \cdot F10 \cdot F11 \cdot F12 \cdot F13 + G43 \end{bmatrix}$$

$$\begin{bmatrix} SF14 = X4 \cdot F8 \cdot F9 \cdot F10 \cdot F11 \cdot F12 \cdot F13 \cdot \overline{F14} + G40 \\ RF14 = X4 \cdot F8 \cdot F9 \cdot F10 \cdot F11 \cdot F12 \cdot F13 \cdot F14 + G41 \end{bmatrix}$$

When the switch settings of the lower-limit counter shown at 19 in FIG. 11 are such that only the switch S7 is thrown to the ON position (S7AB) with all the remaining switches being thrown to the OFF positions (positions AC), then F14 will be forcibly set by G40 at the start clear (the period of X3) while the remaining flip-flops F8 to F13 will be forcibly reset, so that the start number of counts 64 ($A\beta_2 = 128 \times 0.5$) will be set at the lowerilimit counter. Upon the beginning of the normal operation (the period of $\overline{X3}$), the lower-limit counter is counted up from the number of start counts 64 ($A\beta_2$) through control of Signal X2 ($X4 = X2 \cdot \overline{X3}$). Therefore the number of counts ($B_2$) in the lower-limit counter during the normal operation, $$B_2 = A\beta_2 + x$$

($x$ = the number of the read-out address counts)

$$* \; B_2 = 128 \times 0.5 + x$$
$$= 64 + x$$

The states of the count-up actions of the lower-limit counter are illustrated in the reference timing chart (F8 to F14) of FIG. 13.

Referring to FIG. 12, the upper-limit comparator shown at 17 always makes the comparison between the number of output counts ($y$) from the write-in address counter (Q1 to Q7 in FIG. 9-1) and the number of output counts ($B_1 = 96 + x$) from the upper-limit counter (16, F1 to F7 in FIG. 10), whereby it provides a coincidence signal X5 upon the exact coincidence between the count numbers of the two counters. To the input terminals of AND gates G79 to G92, outputs from the respective corresponding counters are applied at any time. (For example, one input terminal of G79 is applied with an LBS counter Q1 output from the write-in address counter, while the other input terminal with an LSB counter $\overline{F1}$ output from the upper-limit counter). Upon coincidence of the numbers of counts in both the counters, all of the respective output terminals of the AND gates G79 to G92 become "false" (= 0) in level, so that the outputs of OR gates $\overline{X5}$ become at the "false" (= 0) level. While the two count numbers do not coincide, the output terminal of any one or more of the AND gates G79 to G97 are at the "true" (= 1) level, with the result that the output of any OR gate $\overline{X5}$ falls into the "true" (= 1) level. More specifically, when the compared numbers of counts in both the counters are brought into exact coincidence, the outputs of the OR gates $\overline{X5}$ will become at the "false" (= 0) level, which will be inverted by a NOT gate X5 to thereby render the output terminal of X5 "true" (= 1) in level. When the output terminal of X5 becomes at the "true" (= 1) level, Coincidence Signal X5 will be supplied to the upper-limit storage. The detection of the coincidence signal X5 is represented by the following logic expressions:

$$X5 = (Q1 \cdot F1 + \overline{Q1} \cdot \overline{F1}) \cdot (Q2 \cdot F2 + \overline{Q2} \cdot \overline{F2}) \cdot (Q3 \cdot F3 + \overline{Q3} \cdot \overline{F3}) \cdot (Q4 \cdot F4 + \overline{Q4} \cdot \overline{F4}) \cdot (Q5 \cdot F5 + \overline{Q5} \cdot \overline{F5}) \cdot (Q6 \cdot F6 + \overline{Q6} \cdot \overline{F6}) \cdot (Q7 \cdot F7 + \overline{Q7} \cdot \overline{F7})$$

As fully understood from the above description, the coincidence signal X5 will be detected when the number of counts ($y$) in the write-in address counter and that ($B_1 = A\beta_1 + x$, $x$ = the number of the read-out address counts) in the upper-limit counter coincide with each other, i.e. under the condition that $$y = A\beta_1 + x = 0.75+$$
$$* \; y = 128 \times 0.75 + x = 96 + x$$

Therefore, at the detection of the coincidence signal X5, the number of vacant addresses (Z) in the buffer storage unit $$Z = A = Y + X$$

When $y = 0.75A + x$, $$z = A - (0.75A + x) + x$$
$$= A - 0.75A$$
$$= 0.25A = 128 \times 0.25 = 32$$

It is thus detected that the number of vacant addresses has reached 25 percent (32 addresses) of the full storage capacity (128 addresses). This also means that the stored quantity of information in the buffer storage unit has reached 75 percent (96 addresses) of the full capacity. More specifically, when the upper-limit value (the 75 percent point) in accordance with the switch settings in the upper-limit counter control (15 in FIG. 10) is reached, Coincidence Signal X5 will be provided. The upper-limit storage 18 stores whether the amount of stored information in the buffer storage unit is over or below the upper-limit value (the 75 percent point) dependent upon the detected state of the coincidence signal X5 from the upper-limit comparator.

The states to be stored are represented by the following logic expressions:

$$\begin{cases} SF15 = X1\cdot\overline{X2}\cdot\overline{X3}\cdot X5 \\ RF15 = \overline{X1}\cdot X2\cdot\overline{X3}\cdot X5 + X3 \end{cases}$$

As shown in the figure, if the coincidence signal X5 is detected during the normal operation (the period of $\overline{X3}$), the output of the OR gate X5 will become at the "true" (= 1) level through an AND gate G400, thus controlling AND gates of a set control one G93 and a reset control one G94 for F15. $X1\cdot\overline{X2}$ indicates, if this condition ($X1\cdot\overline{X2}$) is established when the write-in address counter control signal is present (X1) while the read-out address counter control signal is absent ($\overline{X2}$), i.e. when the output terminal of the AND gate G400 is "true" (= 1) in level, or when the coincidence signal X5 is detected, that the stored quantity of information in the buffer storage unit has exceeded the upper-limit value (the 75 percent point = 96 addresses) (In addition to the information storage quantity of 96 addresses, one address information is written in to provide 97-address storage, so that the upper-limit value is exceeded by one information.) Then the output level of the AND gate G93 becomes "true" (= 1) to thereby set F15. Whereas, the fact that $\overline{X1}\cdot X2$ holds true at the detection of Coincidence Signal X5 means that the stored amount of information in the buffer storage unit has become lower than the upper-limit value (( If the read-out address counter control signal is present (X2) and the write-in address counter control signal is absent ($\overline{X1}$), one address information will be read out from the information storage quantity of 96 addresses upon detection of the coincidence signal, thus making the amount of stored information 95 addresses.)) Then, the output of the AND gate G94 becomes "true" (= 1) in level and resets F15, if under the set state, through the OR gate G95. The flip-flop F15 is therefore set when the information storage quantity in the buffer storage unit is raised over the upper-limit value, while it is reset when said quantity is lowered below the same value. X3 to be applied to the OR gate G95 forcibly set F15 at the start clear (the period of X3), and ensures correct actions during the normal operation (the period of $\overline{X3}$).

The operative states of the upper-limit comparator 17 as well as the upper-limit storage 18 are shown in the reference timing chart of FIG. 13.

In FIG. 12, the lower-limit comparator 21 has quite the same functions as the upper-limit comparator 17. It always makes the comparison between the number of counts (y) in the write-in address counter and the number of output counts ($B_2 = A\beta_2 + X = 64 + X$) from the lower-limit counter (F8 to F14 in FIG. 11), and detects a coincidence signal X6 upon coincidence of the two numbers of counts. The detection of Coincidence Signal X6 is represented by the following logic expressions:

$$X6 = (Q1\cdot F8 + \overline{Q1}\cdot\overline{F8})\cdot(Q2\cdot F9 + \overline{Q2}\cdot\overline{F9})\cdot (Q3\cdot Q10 + \overline{Q3}\cdot\overline{F10})\cdot(Q4\cdot F11 + \overline{Q4}\cdot\overline{F11})\cdot (Q5\cdot F12 + \overline{Q5}\cdot\overline{F12})\cdot(Q6\cdot F13 + \overline{Q6}\cdot\overline{F13})\cdot (Q7\cdot F14 + \overline{Q7}\cdot\overline{F14})$$

Assuming at the detection of Coincidence Signal X6 that $y$ = the number of the write-in address counts, $A\beta_2$ = the lower-limit value, X = the number of the read-out address counts then, $$y = A\beta_2 + x = 0.5A + x$$

$$*\ y = 128 \times 0.5 + x = 64 + x$$

Therefore, at the detection of the coincidence signal X6, the number of vacant addresses (Z) in the buffer storage unit becomes $$z = A - Y + X$$

Under the condition that $y = 0.5A + X$, $$z = A - (0.5A + X) + x$$
$$= A - 0.5A$$
$$= 0.5A = 128 \times 0.5 = 64$$

It is thus detected that the numberof vacant addresses in the buffer storage unit has reached 50 percent (64 addresses) of the full storage capacity (128 addresses), which means that the amount of stored information has reached 50 percent (64 addresses) of the full storage capacity. In other words, when the lower-limit value (the 50 percent point) in accordance with the switch settings in the lower-limit control (19 in FIG. 11) is reached, Coincidence Signal X6 will be provided (become at the "true" level).

The lower-limit storage 22 has quite the same function as the upper-limit storage 18, and stores whether the stored amount of information in the buffer storage unit is over or below the lower-limit value (the 50 percent point), dependent upon the detected state of the coincidence signal X6 from the lower-limit comparator.

The states of the storage are represented by the following logic expressions:

$$\begin{cases} SF16 = X1\cdot\overline{X2}\cdot\overline{X3}\cdot X6 \\ RF16 = \overline{X1}\cdot X2\cdot\overline{X3}\cdot X6 + X3 \end{cases}$$

Therefore, the set state of the flip-flop F16 indicates that the amount of stored information in the buffer storage unit is larger than the lower-limit value (50 percent), while the reset state represents that the same is smaller than the lower-limit value (50 percent).

The operative states of the lower-limit comparator 21 and the lower-limit storage 22 are shown in the reference timing chart of FIG. 13.

As described in Section 5.1.3 and this section, the set or reset state of F15 in the upper-limit storage and F16 in the lower-limit storage allows an easy monitoring of the stored state of information in the buffer storage unit, i.e., the state of the information input quantity per unit time. For example, the state under which F15 of the upper-limit storage is set indicates that the stored quantity of information has exceeded the upper-limit value, and that the amount of input information is too large. The state under which F16 of the lower-limit storage is reset represents that the quantity of stored information has decreased below the lower-limit value, and that the amount of input information is too small. The state under which F16 is set while F15 is reset, means that the quantity of stored information lies between the upper-limit and lower-limit values so that the amount of input information is of a suitable value with logic expressions, Optimum input-amount = $\overline{F15}\cdot F16$ Too small input-amount = $\overline{F15}\cdot\overline{F16}$ Too large input-amount = $F15\cdot F16$ Such monitorings allow the performance of various control for end equipments.

The timing chart shown in FIG. 13 illustrates the information-input-quantity detecting function as stated in Sections 5.1.1 to 5.1.4 Clock-pulses are supplied from the buffer storage unit.

There is shown the operative state under which upon starting of the normal operation, the write-in address counter Q1 to Q7 (8 in FIG. 9-1) is progressively counted up from Count "0" (zero, with all the flip-flops Q1 to Q7 being reset) through control of Signal X1 (7 in FIG. 9-1). (For reference, the numbers of counts are designated above the signals X1.)

There is also shown the operative state under which upon starting of the normal operation, the read-out address counter Q11 to Q17 (11 in FIG. 9-2) is sequentially counted up from Count "0" (zero, with all the flip-flops being reset) through control of Signal X2 (10 in FIG. 9-2). (For reference, the numbers of counts are given above the signals X2.)

Further shown is the state under which upon starting of the normal operation, the lower-limit counter F8 to F14 (20 in FIG. 11) is sequentially counted up from the lower-limit value ($A\beta_2 = 64$, with only the flip-flop 14 being set) forcibly set by the lower-limit counter control, through control of Signal X2 and in synchronism with the read-out address counter (Q11 to Q17). (For reference, the numbers of counts are indicated above the signals F8.)

Although the operative timing chart for the upper-limit counter F1 to F7 (16 in FIG. 10) is omitted from the drawing, there is shown by the numbers of counts the state under which upon starting of the normal operation, the upper-limit counter is progressively counted up from the upper-limit value ($A\beta_1$ = 96, with only the flip-flops F7 and F6 being set) forcibly set by the upper-limit counter control (15 in FIG. 10), through control of Signal X2 and in synchronism with the read-out address counter (Q11 to Q17).

In the middle lower part of the timing chart, there are shown the coincidence signals X6 of the lower-limit comparator (21 in FIG. 12) and the operative states of G110, G111, F16 of the lower-limit storage (22 in FIG. 12). The coincidence signal X6 remains at the "true" (= 1) output level while the number of counts (Address 94) in the write-in address counter and the number of counts (Address 94) in the lower-limit counter coincide with each other, and thus detects the coincidence. At this moment, read-out is going to be performed (On the command of the electronic computer for read-out, Signal X2 is generated to increase the number of counts in the read-out address counter by one), so that the output of the reset control gate G111 ($G111 = \overline{X1}\cdot X2\cdot \overline{X3}\cdot X6$, refer to 22 in FIG. 22) of F16 becomes "true" (= 1) in level, thus preventing F16 from being set. This indicates that the amount of information stored in the buffer storage unit may not exceed the lower-limit value (64 addresses) and is below said value. The numbers of counts in the write-in address counter as well as in the lower-limit counter coincide again at Address 95, and hence the coincidence signal X6 is detected during the coincidence. At this moment, write-in is going to be carried out (Upon input of an information, Signal X1 is generated to increase the number of counts in the write-in address counter by one), so that the output of the set control gate G110 ($G110 = X1\cdot \overline{X2}\cdot \overline{X3}\cdot X6$, refer to 22 in FIG. 12) of F16 becomes at the "true" (= 1) level, thus setting the flip-flop F16.

The set state of F16 indicates that the quantity of stored information in the buffer storage unit has exceeded the lower-limit value (64 addresses).

In the right-hand lower part of the timing chart, there are shown the coincidence signals X5 of the upper-limit comparator (17 in FIG. 12) and the operative states of G93, G94, F15 of the upper-limit storage (18 in FIG. 12). The coincidence signal X5 remains "true" (= 1) in the output level while the number of counts (Address 32) in the write-in address counter and that (Address 32) in the upper-limit counter coincide with each other, and thus detects the coincidence. At this moment, when upon generation of the signal X1, write-in is going to be effected, the output of the set control gate G93 ($G93 = X1\cdot \overline{X2}\cdot \overline{X3}\cdot X5$, 18 in FIG. 12) of F15 will fall into the "true" (= 1) level to set the flip-flop F15.

If F15 is set, it is judged that the input quantity of information in the buffer storage unit is excessive. Then, when control by the automatic detection-reference controller is effected to reduce the amount of input information, the number of counts (Address 33) in the write-in address counter and that (Address 33) in the upper-limit counter coincide as shown in the chart to effect the detection of Coincidence Signal X5. However, the generation of the signal X1 does not reset F15. Upon recoincidence of the numbers of counts at Address 34, read-out is going to be performed by Signal X2, so that the output of the reset control gate G94 ($G94 = \overline{X1}\cdot X2\cdot \overline{X3}\cdot X5$, refer to 18 in FIG. 12) of F15 becomes at the "true" (= 1) level, thus resetting the flip-flop F15.

The reset state of F15 means that the amount of stored information in the buffer storage unit is smaller than the upper-limit value (75 percent). Therefore the fact that the flip-flop F15 is under the reset state while F16 is under the set state, indicates that the stored quantity of information in the buffer storage unit, i.e., the input quantity of information in the same is optimum.

The following various sections relate to a control circuit for automatically selecting one of the detection references for the digital wake information detecting mechanism (3 in FIG. 7).

In FIG. 14, X7, X8, X9 and $\overline{X9}$ respectively represent input states of information in the buffer storage unit being monitored by the information-input-quantity detecting function. With logic expressions, $$\begin{cases} F15 = \text{Over the upper-limit value} \\ F16 = \text{Over the lower-limit value} \end{cases}$$

$$X7 = \overline{F15}\cdot\overline{F16}$$

$$X8 = F15\cdot F16$$

$$X9 = \overline{F15}\cdot F16$$

$$\overline{X9} = F15 + \overline{F16}$$

$$\begin{cases} \overline{F15} = \text{Below the upper-limit value} \\ \overline{F16} = \text{Below the lower-limit value} \end{cases}$$

An UP control signal X7 detects that the input amount of information is too small, and instructs to increase it.

A DOWN control signal X8 detects that the input amount of information is too large, and instructs to decrease it.

A NORMALITY detecting signal X9 indicates that the input quantity of information is suitable, whereas $\overline{X9}$ represents that the same is not suitable.

A TROUBLE detecting signal X10 ($X10 = F15\cdot\overline{F16}$) detects any disorder in the circuit of the information-input-quantity detecting function, and is applied to the display.

In the figure, F17 and F18 govern controls for selecting Detection Reference Set No. 1 in the wake information detecting mechanism, respectively, while F19 monitors the results.

F20 F21 govern controls for selection of Detection Reference Set No. 2, respectively, while F22 monitors the results.

F23 and F24 govern controls for selecting Detection Reference Set No. 3, respectively, and the results are monitored by F25.

F26 and F27 govern controls for selection of Detection Reference Set No. 4, respectively, and F28 monitors the results.

F29 and F30 govern controls for selecting Detection Reference Set No. 5, respectively, and F31 monitors the results.

X12, X13 and F33, F34 respectively shown at the left-hand middle part of the drawing govern an auxiliary control for allowing the automatic control function to be accurately performed in response to the circumstances; X14 and F35 govern a control in timing; and X11 at the middle part of the drawing governs controls at the start clear and during the interference state.

The logic expressions are as follows:

Selection of Set No. 1 (F17, F18, F19)

$$\begin{cases} SF17 = X7\cdot F22\ \overline{F23} \\ RF17 = F17\cdot F35 + X11 + X14 \end{cases}$$

$$\begin{cases} SF18 = F17\cdot F35 \\ RF18 = F20\cdot F35 + X11 \end{cases}$$

$$\begin{cases} SF19 = F18\cdot F35 \\ RF19 = F20\cdot F35 + X11 \end{cases}$$

Selection of Set No. 2 (F20, F21, F22)

$$\begin{cases} SF20 = X7\cdot F25\cdot\overline{F26} + X8\cdot F18 \\ RF20 = F20\cdot F35 + X11 + X14 \end{cases}$$

$$\begin{cases} SF21 = F20\cdot F35 \\ RF21 = F17\cdot F35 + F23\cdot F35 + X11 \end{cases}$$

$$\begin{cases} SF22 = F21\cdot F35 \\ RF22 = F17\cdot F35 + F23\cdot F35 + X11 \end{cases}$$

Selection of Set No. 3 (F23, F24, F25)

$$\begin{cases} SF23 = X7\cdot F28\cdot\overline{F29} + X8\cdot F22\cdot\overline{F17} \\ RF23 = F23\cdot F35 + X11 + X14 \end{cases}$$

$$\begin{cases} SF24 = F23\cdot F35 + X11 \\ RF24 = F20\cdot F35 + F26\cdot F35 \end{cases}$$

$$\left[\begin{array}{l} SF25=F24\cdot F35\cdot F36\cdot\overline{F36}\cdot\overline{X3} \\ RF25=F20\ F35+F26\ F35+X11 \end{array}\right.$$

Selection of Set No. 4 (F26, F27, F28)

$$\left[\begin{array}{l} SF26=X7\cdot F31+X8\cdot F25\cdot\overline{F20} \\ RF26=F26\cdot F35+X11+X14 \end{array}\right.$$

$$\left[\begin{array}{l} SF27=F26\cdot F35 \\ RF27=F23\cdot F35+F29\cdot F35+X11 \end{array}\right.$$

$$\left[\begin{array}{l} SF28=F27\cdot F35 \\ RF28=F23\cdot F35+F29\cdot F35+X11 \end{array}\right.$$

Selection of Set No. 5 (F29, F30, F31)

$$\left[\begin{array}{l} SF29=X8\cdot F28\cdot\overline{F23} \\ RF29=F29\cdot F35+X11+X14 \end{array}\right.$$

$$\left[\begin{array}{l} SF30=F29\cdot F35 \\ RF30=F26\ F35+X11 \end{array}\right.$$

$$\left[\begin{array}{l} SF31=F30\cdot F35 \\ RF31=F26\cdot F35+X11 \end{array}\right.$$

Counter Control (X12, X13)

$X12=\overline{F34}\cdot\overline{F32}(X7+X8),(F17+F20+F23+F26+F29)$ $X13=\overline{F17}\ \overline{F20}\ \overline{F23}\ \overline{F26}\ \overline{F29}$ State Counter (F35, F34)

$$\left[\begin{array}{l} SF33=X12\cdot\overline{F33} \\ RF33=X13 \end{array}\right.$$

$$\left[\begin{array}{l} SF34=X12\cdot F33\cdot\overline{F34} \\ RF34=X13 \end{array}\right.$$

Reset Control $X14=X9\cdot\overline{F34}$ ·-second Signal 5-second Signal = Signal which remains at the "true" (= 1) level for one clock time at intervals of 5-seconds (refer to F35 in FIG. 16).

Delay Timing (F35)

$$\left[\begin{array}{l} SF35=\text{5-second Signal} \\ RF35=F35 \end{array}\right.$$

Set/Reset Control (X11)

X11 = X3+F36

F36 = Interference-State Detecting Signal (refer to the left-hand upper part of FIG. 17).

These operations of the automatic detection-reference controller will be described with reference to the reference timing chart of FIG. 16. At the start clear (refer to Section 4.2), X3 becomes "true" (= 1) in level. Therefore the output of the OR gate X11 falls into the "true" (= 1) level, whereby F24 is set through an OR gate G135 and all the remaining flip-flops (F17 to F23, F25 to F31) are reset by X11.

Accordingly, at the time of starting, Detection Reference Set No. 3 is forcibly set by the setting of F24 (refer to F24 in FIG. 16).

Each time a 5-second signal is supplied, the delay timing flip-flop F35 provides a signal which is delayed by one clock time and which remains at the "true" (= 1) level for one clock time at intervals of 5 seconds. The signal F35 renders the output level of a set control gate G143 of F25 (( $G143=\overline{X3}\cdot\overline{F36}\cdot F35\cdot F24$. If no interference state is present ($\overline{F36}$) during the normal operation ($\overline{X3}$), the signal F35 will be provided by the setting of Detection Reference Set No. 3 (F24) )) "true" (= 1) to thereby set F25 (refer to F25 in FIG. 16).

The setting F25 starts monitoring of the state (the state of information input to the buffer storage unit) which resulted from the selection of Detection Reference Set No. 3.

If during the state monitoring by the setting of F25, the input amount of information in the buffer storage unit is too small (detection of X7), then the output of a set control gate G115 of F20 ($G115=X7\cdot F25\cdot\overline{F26}$) becomes "true" ( = 1) in level, thereby to set CHANGE·DET·F20 through an OR gate G117 (refer to X7 and F20 in FIG. 16).

If, after the setting of F20, the signal F35 (a 5-second signal delayed by one clock time) is generated and the setting of F20 remains held, then the output of a set control gate G131 of F21 will become at the "true" (= 1) level, simultaneously to set F21, to reset F24 through an OR gate G136, to reset F25 through an OR gate G144, and to reset F20 through an OR gate G118. This will instantly change-over Detection-Reference Set No. 3 to Set No. 2 thereby to increase the input quantity of information in the buffer storage unit.

Setting of F22 which monitors the state resulted from the setting of Detection-Reference Set No. 2, is carried out through a set control gate G142 by the subsequently occurring signal F35. (Refer to FIG. 16).

That is, an shown in the operative timing chart of FIG. 16 for F21 and F22, a correcting period of time attendant upon the change in the detection reference is given between the selection of Detection-Reference Set No. 2 by the setting of F21 and the setting of F22.

When F22 is set, the state resultant from the setting of Detection-Reference Set No. 2 will be monitored.

If, during the state monitoring by the setting of F22, the input amount of information is still small and hence the UP control X7 is detected, then CHANGE·DET·No. 1·F17 will be set through G113, and F18 will be set through G129 by the next occurring 5-second signal. Simultaneously therewith, F17 and F21 are reset thereby to select Detection-Reference Set No. 1. F19 is set 5-seconds after starting of the operation owing to the selection of Detection-Reference Set No. 1, thus to start the state monitoring. Furtheremore, if during the set period of F22 any state occurs under which the input quantity of information is excessive, then the DOWN control X8 will be detected, CHANGE·DET·No. 3 will be set through G120, and F24 will be set through G134 by the subsequently produced 5-second signal. Simultaneously therewith, F21 and F23 are reset to select Detection-Reference Set No. 3. F25 is set 5-seconds after starting of the operation upon the selection of Detection-Reference Set No. 3, thus to start the state monitoring. Reset signals X14 of the respective CHANGE·DET flip-flops (F17, F20, F23, F26, F29) effect controls of the amount of input information against any instantaneous change in state.

They attain effective controls during, for example, the operation which resulted from the selection of Detection-Reference Set No. 3 (with F24 and F25 being set), in such cases where the detection of the UP control X7 occurs instantaneously and normality is immediately restored (detection of the NORMAL detecting signal X9), or where several or more detections are done per unit time.

X14 will now be explained in detail. X12 detects output signals which, after X7 or X8 is detected and the corresponding CHANGE·DET flip-flop (any one of F17, F20, F23, F26 and F29) is set, remain at the "true" (= 1) level for one clock time each time X7 or X8 is detected. Provided, however, that where such detections have been done more than two times, they are prohibited by setting of F34.

The related logic expressions are:

$$\left[\begin{array}{l} SF32=X7+X8 \\ RF32=\overline{X7}\cdot\overline{X8} \end{array}\right.$$

$$G149=\overline{F32}\cdot(X7+X8)$$

$$X12=G149\cdot\overline{F34}\cdot(F17+F20+F23+F26+F29)$$

State counters F33 and F34 count the detected times of X12, and upon twice detections, F34 is set. Resetting of F33 and F34 is effected through detection of X13 (when the corresponding CHANGE·DET flip-flop is reset).

The related logic expressions are:

$$\left[\begin{array}{l} SF33=X12\cdot\overline{F33} \\ RF33=X13 \end{array}\right.$$

$$\left[\begin{array}{l} SF34=X12\cdot F33\cdot\overline{F34} \\ RF34=X13 \end{array}\right.$$

$$X13=\overline{F17}\cdot\overline{F20}\cdot\overline{F23}\cdot\overline{F26}\cdot\overline{F29}$$

Therefore, the setting of F34 will be effected, if several or more times of detections of X7 or X8 are done within 5 seconds after starting of the state monitoring.

The reset control X14 is represented by the logic expression of X14= X9·F34-second Signal. That is to say, if the input amount of information has returned to the normal state (detection of X9) and the times of occurrence of X7 or X8 were equal to or less than twice in the part 5 seconds ($\overline{\mathbf{F34}}$), then the corresponding CHANGE·DET is reset thereby rejecting change in the detection reference.

(Note: X14 is detected one clock time earlier than F35.)

According to these controls, the automatic selection of detection references do not follow instantaneous state changes, but effective and accurate controls on the basis of a collective judgement may be achieved.

$\overline{F23}$, F26, $\overline{F29}$, F17, $\overline{F20}$ and $\overline{F23}$ respectively applied to one input terminal of each of the set control gates G113, G115, G119, G120, G124 and G127 of the CHANGE·DET flip-flops, prevent abnormal operations of the automatic detection-reference controller as being due to any abnormal phenomena.

Referring to FIG. 15, and AUTO/MAN change-over switch S14 effects, for the digital information processing and wake information detecting mechanism (3 in FIG. 7), an automatic selection control by the automatic detection-reference controller (FIG. 14) at one position AUTO (S14AB), while a manual selection control as having hitherto been put into practice and by a detection-reference selector switch (S13) at the other position MAN (S14AC).

Further operations represented by logic expressions are:

Selection Output No. 1

G155=S14AB·F18+S14AC·S13AB

Selection Output No. 2

G158=S14AB·F21+S14AC·S13AC

Selection Output No. 3

G161=S14AB·F24+S14AC·S13AD

Selection Output No. 4

G164=S14AB·F27+S14AC·S13AE

Selection Output No. 5

G167=S14AB·F30+S14AC·S13AF

This section is directed to a circuit which performs automatic detection of an interference state and automatic selection of the optimum one of interference eliminating circuits for the radar equipment through the detection of the interference state.

Referring to FIG. 17, an interference-state detector flip-flop F36 detects a state under which pseudo wake information inputted to the buffer storage unit of the system are abnormally excessively produced or abnormally reduced on account of, e.g., interference waves from outside as received by the radar receiver. The output terminal of a normal-state control X15 is always at the "true" (= 1) level during the normal operation.

The logic expressions are as follows:

(Refer to FIG. 14.)

F19 = Monitoring State for Detection-Reference Set No. 1.

F31 = Monitoring State for Detection-Reference Set No. 5.

X7 = Below Lower-Limit Value.

X8 = Over Upper-Limit Value.

$$\left[\begin{array}{l} SF36 = X7{\cdot}F19 + X8{\cdot}F31 \\ RF36 = S17AB \text{ (Reset Switch ON)} \end{array}\right.$$

$$X15 = \overline{F36} + G171$$

$$G171 = F36{\cdot}\overline{F38}{\cdot}\overline{F41}{\cdot}\overline{F44}{\cdot}\overline{F47}$$

More specifically, if X7 is still detected (G168) under the condition that F19 is set or if X8 is detected (G169) under the condition that F31 is set, then F36 will be set through an OR gate G170 to reach the detection of an interference state. When F36 is set, F24 of the automatic detection-reference controller (refer to FIG. 14) will be forcibly set through X11, so that Detection-Reference Set No. 3 will be fixed and therewith the selecting control for the interference eliminating circuits will begin. X15 remains "true" (= 1) in the output level during the normal operation ($\overline{\mathbf{F36}}$) and from the detection of the interference state till a flip-flop F38 of Interference-Eliminating-Circuit Set No. 1 is set, and it effects control of the normal operative state (a state under which no interference-removal is required) during the automatic selection.

In FIG. 17, flip-flops F37 and F38 control the selection of Interference-Eliminating-Circuit Set No. 1, and F 9 monitors the results.

F40 and F41 control the selection of Interference-Eliminating-Circuit Set No. 2, and the results are monitored by F42.

F43 and F44 control the selection of Interference-Eliminating-Circuit Set No. 3 and F45 monitors the results.

F46 and F47 effects control of the selection of Interference-Eliminating-Circuit Set No. 4, and F48 monitors the results.

These operations are represented by the following logic expressions:

Set No. 1 (F37, F38, F39)

$$\left[\begin{array}{l} SF37 = F36{\cdot}\overline{F38}{\cdot}\overline{F41}{\cdot}\overline{F44}{\cdot}\overline{F47} \\ RF37 = F35{\cdot}F37 + \overline{F36} \end{array}\right.$$

$$\left[\begin{array}{l} SF38 = F35{\cdot}F37 \\ RF38 = F35{\cdot}F40 + \overline{F36} \end{array}\right.$$

$$\left[\begin{array}{l} SF39 = F35{\cdot}F38 \\ RF39 = F35{\cdot}F40 + \overline{F36} \end{array}\right.$$

Set No. 2 ($F40$, $F41$, $F42$)

$$\left[\begin{array}{l} SF40 = \overline{X9}{\cdot}F39 \\ RF40 = F35{\cdot}F40 + \overline{F36} \end{array}\right.$$

$$\left[\begin{array}{l} SF41 = F35{\cdot}F40 \\ RF41 = F35{\cdot}F43 + \overline{F36} \end{array}\right.$$

$$\left[\begin{array}{l} SF42 = F35{\cdot}F41 \\ RF42 = F35{\cdot}F43 + \overline{F36} \end{array}\right.$$

Set No. 3 (F43, F44, F45)

$$\left[\begin{array}{l} SF43 = \overline{X9}{\cdot}F42 \\ RF43 = F35{\cdot}F43 + \overline{F36} \end{array}\right.$$

$$\left[\begin{array}{l} SF44 = F35{\cdot}F43 \\ RF44 = F35{\cdot}F46 + \overline{F36} \end{array}\right.$$

$$\left[\begin{array}{l} SF45 = F35{\cdot}F44 \\ RF45 = F35{\cdot}F46 + \overline{F36} \end{array}\right.$$

Set No. 4 ($F46$, $F47$, $F48$)

$$\left[\begin{array}{l} SF46 = \overline{X9}{\cdot}F45 \\ RF46 = F35{\cdot}F46 + \overline{F36} \end{array}\right.$$

$$\left[\begin{array}{l} SF47 = F35{\cdot}F46 \\ RF47 = \overline{F36} \end{array}\right.$$

$$\left[\begin{array}{l} SF48 = F35{\cdot}F47 \\ RF48 = \overline{F36} \end{array}\right.$$

Referring to the reference timing chart of FIG. 18, these automatic selection functions will be stated in detail. If, under the monitoring state of the operation resulted from the selection of Detection-Reference Set No. 5 (with F31 being set), the input amount of information is still too large (detection of X8) (refer to FIG. 14), then the output of an AND gate G169 will fall into the "true" (= 1) level (refer to G169 in FIG. 18), whereby the interference-state detector F36 will be set with a delay of one clock time (refer to F36 in FIG. 18). Upon setting of F36, the output of an AND gate G171 becomes at the "-true" (= 1) level to thereby set F37. F37 is set with a delay of one clock time over F36 (refer to F37 in FIG. 18). (hereinafter, such delay of one clock time will not be mentioned.) When F37 is set and the 5-second signal F35 is applied to one input terminal of an AND gate G175, then the output level of G175 will remain "true" (= 1) for one clock time thereby to set a flip-flop F38 of Interference-Eliminating-Circuit Set. No. 1 (refer to F38 in FIG. 18). Upon setting of F38, its output selects Interference-Eliminating-Circuit Set No. 1 in the radar equipment through an AND gate G195

(left-hand middle part of FIG. 17) as well as an OR GATE G204. When F38 falls into the set state and the subsequently occurring 5-second signal F35 is applied to one input terminal of an AND gate G177, then G177 will become "true" (= 1) in the output level, so that a monitoring flip-flop F39 will be set (refer to F39 in FIG. 18). The setting of F39 starts monitoring of the results owing to the selection of Interference-Eliminating-Circuit Set No. 1. If the selection of Interference-Eliminating-Circuit Set No. 1 is unsuitable, detection of Signal X8 will continue and the output of $\overline{X9}$ will remain "true" (= 1) in level. If Signal $\overline{X9}$ is detected even after starting of monitoring of the state resulted from the selection of Interference-Eliminating-Circuit Set No. 1 as attained by the setting of F39, then selection of the next Interference-Eliminating-Circuit Set No. 2 will be carried out. An AND gate G178 has its output rendered "true" in level by "true" level signals of its input terminals F39 and $\overline{X9}$, whereby a flip-flop 41 of Interference-Eliminating-Circuit Set No. 2 is set (refer to F38, F40 and F41 in FIG. 18). Simultaneously therewith, F38 is reset through an OR gate G176.

The setting of F41 selects Interference-Eliminating-Circuit Set No. 2 through an AND gate G197 as well as an OR gate G205. The, operation owing to the selection of Interference-Eliminating-Circuit Set No. 2 is started, the next occurring 5-second signal is applied to an AND gate G182, the output thereof becomes at the "true" (= 1) level to thereby set a monitoring flip-flop F42, and monitoring of the state resultant from the selection of Interference-Eliminating-Circuit Set No. 2 is started.

If the particular interference waves are removed through use of the Interference Eliminating Circuit No. 2, the output signal of X9 (refer to FIG. 14) will fall into the "true" level, while the signal $\overline{X9}$ will not be detected or will be "false" (= 1). Thus, the set state of F41 will continue, and hence the selection of Interference-Eliminating-Circuit Set No. 2 will be maintained.

In this manner, the Interference-Eliminating-Circuit Sets No. 1 to No. 4 are sequentially subjected to the selection of the optimum one of the circuits.

These operations are shown in the reference timing chart of FIG. 18. Upon disappearance of the interference state, a reset switch S17 (the middle lowermost part of FIG. 17) is pressed by the operator, whereby an ordinary-time control by a signal X15 (the left-hand uppermost part of FIG. 17) is started. Simultaneously therewith, the automatic detection-reference controller (refer to FIG. 14) restores the normal automatic control function.

In FIG. 17, an OR gate G203 effects the selection of an Ordinary Circuit for the ordinary period of time (under non-interference-state); G204 the selection of Interference-Eliminating-Circuit Set No. 1; G205 the selection of Interference-Eliminating-Circuit Set No. 2; G206 the selection of Interference-Eliminating-Circuit Set No. 3; and G207 the selection of Interference-Eliminating-Circuit Set No. 4.

With the AUTO/MAN change-over switch S16 (the middle lowermost part of FIG. 17) thrown to the MAN position (S16AC), the outputs of the set output OR gates G203, G204, G205, G206 and G207 are controlled through selection of the manual selection switch S15. Whereas, with S16 being thrown to the AUTO position (S16AB), control is effected by the outputs of the automatic interference-eliminating-circuit selecting flip-flops F38, F41, F44, F47 and X15.

These operations are represented by the following logic expressions:

Ordinary Set (G203)

G203 = X15·S16AB+S15AB·S16AC

Set No. 1 (G204)

G204 = F38·S16AB+S15AC·S16AC

Set No. 2 (G205)

G205 = F41·S16AB+S15AD·S16AC

Set No. 3 (G206)

G206 = F44·S16AB+S15AE·S16AC

Set No. 4 (G207)

G207 = F47·S16AB+S15AF·S16AC

A trouble detection X16 at the right-hand lowermost part of FIG. 17 is represented by the following logic expression:

$$X16 = F48 \cdot \overline{X9} + X10$$

Therefore, if the interference eliminating circuits are automatically subjected to the sequential selections to select the final Interference-Eliminating-Circuit Set No. 4 and yet the normal operation is not reached (the $\overline{X9}$ state), then an AND gate G192 will become "true" (= 1) in the output level, whereupon the trouble detection X16 will detect that the system is under the trouble state. Furthermore, Signal X10 (any trouble in the information-input-quantity detecting function, refer to FIG. 14) is fed to a display, which displays the trouble state.

There will be discussed in this section an automatic memory control which prevents the buffer storage unit from being saturated on account of input information being temporarily and excessively generated by any cause, and in addition, which prevents duplicate write-in of information.

Referring to FIG. 19, the delay register 26 always sets the number of counts (X − 1) which is one count prior to the present number of address counts (X) in the read-out address counter Q11 to Q17 (refer to FIG. 9-2), in parallel at flip-flops F51 to F57 and through control of the read-out address counter control signal X2 (refer to 10 in FIG. 9-2).

These operations are represented by the following logic expressions:

1SB $$\begin{cases} SF51 = X2 \cdot \overline{X3} \cdot Q11 \\ RF51 = X2 \cdot \overline{X3} \cdot \overline{Q11} \end{cases}$$

2SB $$\begin{cases} SF52 = X2 \cdot \overline{X3} \cdot Q12 \\ RF52 = X2 \cdot \overline{X3} \cdot \overline{Q13} \end{cases}$$

3SB $$\begin{cases} SF53 = X2 \cdot \overline{X3} \cdot Q13 \\ RF53 = X2 \cdot \overline{X3} \cdot \overline{Q13} \end{cases}$$

4SB $$\begin{cases} SF54 = X2 \cdot \overline{X3} \cdot Q14 \\ RF54 = X2 \cdot \overline{X3} \cdot \overline{Q14} \end{cases}$$

5SB $$\begin{cases} SF55 = X2 \cdot \overline{X3} \cdot Q15 \\ RF55 = X2 \cdot \overline{X3} \cdot \overline{Q16} \end{cases}$$

6SB $$\begin{cases} SF56 = X2 \cdot \overline{X3} \cdot Q16 \\ RF56 = X2 \cdot X3 \cdot Q16 \end{cases}$$

MSB $$\begin{cases} SF57 = X2 \cdot \overline{X3} \cdot Q17 \\ RF57 = X2 \cdot \overline{X3} \cdot \overline{Q17} \end{cases}$$

More specifically, at the start clear (the period of X3 ) of the system, the MSB flip-flop F51 is forcibly set (the number of counts: 64) through an OR gate G222 by the signal X3. Upon starting of the normal operation (the period of $\overline{X3}$), the flip-flop F51 is counted up with one count lagging behind the number of counts in the read-out address counter through control of the signal X2. These count-up actions are referred to in the operative timing chart for the read-out address counter and the delay register shown in the upper half of FIG. 20. For reference, the numbers of counts are given at the upper part of the chart.

In FIG. 19, the comparator 27 always makes the comparison between the number of counts (Y) in the write-in address counter and that (X − 1) in the delay register. Upon coincidence of the numbers of counts, the output of a NOT gate X17 becomes at the "true" (= 1) level, so that Coincidence Signal X17 is detected.

The detection of X17 is represented by logic expression, as follows:

$$X17 = (Q1 \cdot F51 + \overline{Q1} \cdot \overline{F51}) \cdot (Q2 \cdot F52 + \overline{Q2} \cdot \overline{F52}) \cdot (Q3 \cdot F53 + \overline{Q3} \cdot \overline{F53}) \cdot (Q4 \cdot F54 + \overline{Q4} \cdot \overline{F54}) \cdot (Q5 \cdot F55 + \overline{Q5} \cdot \overline{F55}) \cdot (Q6 \cdot F56 + \overline{Q6} \cdot \overline{F56}) \cdot (Q7 \cdot F57 + \overline{Q7} \cdot \overline{F57})$$

The detection of Coincidence Signal X17 is illustrated in the reference timing chart which, in the lower half of FIG. 20, shows the counting states of the delay register as well as the write-in address counter and the detection of X17.

In FIG. 19, the time corrector 28 detects through detection of the coincidence signal X17 that the stored amount of information in the buffer storage unit has come to the point immediately before saturation with one information address left. At the same time as the last one vacant address has had an information written in, it provides a write-in prohibiting signal $\overline{F50}$ thereby to prohibit write-in of information in the buffer storage unit.

A time-corrector flip-flop F50 is represented by the following logic expressions:

$$\begin{cases} SF50 = X17 \cdot X1 \\ RF50 = X2 \cdot F50 \end{cases}$$

Therefore F50 will be immediately set when, in the state under which Coincidence Signal X17 is being detected (the state under which the storage quantity of information leaves one address vacant), the last one vacant address has had an information written in (by the write-in address counter Q1 to Q7) by Signal X1 (refer to the write-in address counter control signal, 7 in FIG. 9-1) and the next write-in address is going to be specified. Then, the reset output $\overline{F50}$ thereof will fall into the "false" (= 0) level and will be applied to one input terminal of the AND gate G402 of the controller 7 in FIG. 9-1 thereby to reject any input of information.

The operation of F50 is referred to in the reference timing chart of FIG. 20.

Referring to FIG. 19, an idle-reading prohibiting signal control 62 effects a partial correction of an idle-reading prohibiting signal as attended by the time correction of one information address write-in in the time corrector 28. The idle-reading prohibiting signal will now be briefly-stated. By means of the comparator, the numbers of the counts (X and Y) in the write-in address counter (Q1 to Q7) and in the read-out address counter (Q11 to Q17) are always compared, and a signal of the "false" (= 0) level is detected upon coincidence of both the numbers of the counts. The "false" (= 0)–level output detected by the comparator is supplied to the read-out address counter controller (refer to 10 in FIG. 9-2) to thereby prohibit the production of the signal X2. Thereby, idle-reading of information is prohibited.

$$\overline{\text{Idle-Reading Prohibiting Signal}} = (Q1 \cdot Q11 + \overline{Q1} \cdot \overline{Q11}) \cdot (Q2 \cdot Q12 + \overline{Q2} \cdot \overline{Q12}) \cdot (Q3 \cdot Q13 + \overline{Q3} \cdot \overline{Q13}) \cdot (Q4 \cdot Q14 + \overline{Q4} \cdot \overline{Q14}) \cdot (Q5 \cdot Q15 + \overline{Q5} \cdot \overline{Q15}) \cdot (Q6 \cdot Q16 + \overline{Q6} \cdot \overline{Q16}) \cdot (Q7 \cdot Q17 + \overline{Q7} \cdot \overline{Q17})$$

("false" = 0 level)

Thus, during the ordinary normal-operation, the output thereof is at the "true" (= 1) level and provides normal read-out.

When no write-in information is present and read-out of information proceeds to complete that of all the stored information, then the numbers of the counts in both the address counters will coincide and the output thereof will become "false" (= 0) to prohibit idle-reading of information.

In 62, FIG. 19, a NOT gate G240, an AND gate G241 and an OR gate G242 reject output of the idle-reading prohibiting signal during saturation of the storage unit as caused by the time corrector 28 (The numbers of the counts in both the counters coincide also during the saturation.), thus providing read-out of information during the saturation.

The logic expressions are as follows:

$$G242 = \overline{\text{Idle-Reading Prohibiting Signal}} + \text{Idle-Reading Prohibiting Signal} \cdot F50$$

Provided that, read-out of information is normally carried out at the "true" (= 1) output level of G242, while idle read-out becomes prohibited when the output of G242 has been rendered "false" (= 0).

The condition of coincidence between the numbers of the counts in both the address counters is set up in two cases; during saturation of the storage unit, and under the state with all the information addresses being read out to render the samevacant. Therefore, correction by the idle-reading prohibiting control G242 provides accurate control of the prohibition of idle reading.

In this section, various displays will be described.

Referring to FIG. 21, LAMP No. 1 at the left-hand uppermost part of the drawing displays that selection of the detection references is under the automatic control.

LAMPs No. 2 to No. 5 respectively represent Set Nos. of the detection reference which is presently under selection through either the automatic or manual selection. (Refer to FIG. 15.)

LAMP No. 7 at the middle uppermost part of the figure indicates that selection of the interference eliminating circuits is under the automatic selection.

LAMPs No. 8 to No. 12 respectively represent the types of the interference eliminating circuit which is presently set through either the automatic or manual selection. (Refer to FIG. 17)

Downwards from the right-hand uppermost part of the figure, LAMP No. 13 displays that an interference state has been detected, while LAMP No. 14 indicates that any equipment is under a faulty condition. LAMP No. 15 displays the state under which theinput amount of information in the buffer storage unit is too large at present, whereas LAMP No. 16 the state under which the same is too small.

Particularly the displays of the X8 state (too large) as well as the X7 state (too small) by means of the LAMPs No. 15 and No. 16, respectively, will facilitate controls of the manual detection-reference selection and selection of the optimum interference-eliminating circuit.

6.0 Control System using Limited Addition-and-Subtraction Counter (FIGS. 22 to 28)

This chapter is devoted to a system which more effectively perform the function of detecting the input quantity of information in the buffer storage unit and the automatic memory controls (the duplicate write-in prohibiting control and the idle-reading prohibiting control), using a limited addition-and-subtraction counter and utilizing the write-in address counter control signal (X1, refer to 7 in FIG. 9-1) as well as the read-out address counter control signal (X2, refer to 10 in FIG. 9-2).

Figure 22:
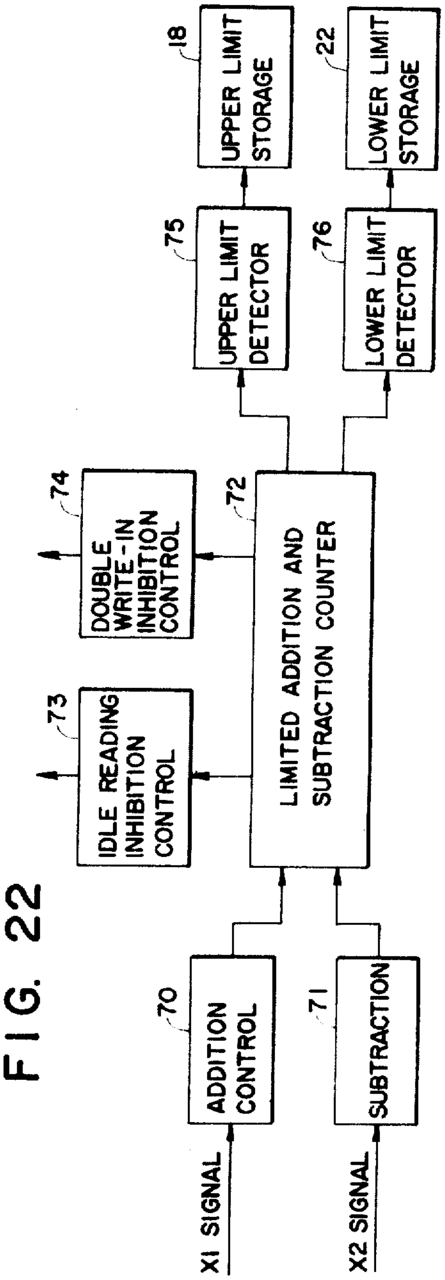
FIG. 22 is a block diagram showing an automatic control unit constructed in accordance with another embodiment of the invention.

Referring to FIG. 22, an additional control 70 supplies to a limited addition-and-subtraction counter 72 a control signal for one count-up (one addition) of the counter 72, each time an information to be written in the buffer storage unit is inputted during the normal operation (the period of X3 .

A subtraction control 71 feeds to the limited addition-and-subtraction counter 72 a control signal for one count-down (one subtraction) of the counter 72, every time read-out of an information in the buffer storage unit is carried out during the normal operation.

These control signals fall into the "true" (= 1) level for one clock time and are in synchronism with Signal X1 or X2.

The limited addition-and-subtraction counter 72 performs, within a range from Count "0" (zero) to the maximum number of counts (127 according to this embodiment), one addition each time the control signal from the addition control 70 is inputted thereto, while one subtraction every time the control signal from the subtraction control 71 is inputted thereto. The addition-and-subtraction counter monitors the stored amount of information, i.e., the input quantity of information in the buffer storage unit by the addition and subtraction actions.

An idle-reading prohibiting controller 74 provide the automatic memory control function in the buffer storage unit. The idle-reading prohibiting controller 73 detects a control signal for inhibiting idle-reading, under the state where the limited addition-and-subtraction counter 72 is of Count "0" (zero), i.e. the number of stored information in the buffer storage unit is "0" (zero). (The request of read-out from the electronic computer is rejected. This is attained by supplying the idle-reading prohibiting signal to the read-out address counter controller 10, FIG. 9-2, to thereby prohibit the production of the signal X2.)

The duplicate write-in prohibiting controller 74 detects a control signal for prohibiting duplicate write-in thereby to prohibit information from being written in the buffer storage unit, under the state where the limited addition-and-subtraction counter 72 is of the maximum number of counts (Count 127), that is to say, upon reaching saturation of the quantity of stored information in the buffer storage unit (the total storable number of information A(128) − 1 information). This prohibits of prohibits of production of Signal X1 by supplying a write-in prohibiting signal (a signal corresponding to $\overline{\mathrm{F50}}$) to the write-in address counter controller 7, FIG. 9-1.)

Therefore, the limited addition-and-subtraction counter 72 precisely counts the information write-in number as well as the information read-out number in the buffer storage unit. At Count "0" (zero), it is always prohibited from read-out of information, so no subtraction input from the subtraction control is present, and only write-in is performed. Whereas, simultaneously with reaching the maximum number of counts, it is prohibited from write-in of information, so any addition input from the addition control is absent, and only read-out is carried out.

By these automatic memory controls, the limited addition-and-subtraction counter effects addition and subtraction within the range from Count "0" (zero) to the maximum number of counts, thereby accurately counting the stored number of information in the buffer storage unit in real time.

An upper-limit value detector 75 provides a detection signal to supply it to the upper-limit storage 18, which signal will become at the "true" (= 1) level when the number of counts in the limited addition-and-subtraction counter 72 coincides with the number of counts as determined by a switch setting (hereinafter termed the "upper-limit value"), namely when the number of stored information in the buffer storage unit coincides with the number of the switch setting.

The upper-limit storage 18 stores whether the count number of the counter 72 is below or over the upper-limit value by means of the detection signal from the upper-limit value detector 75. (The upper-limit storage 18 is shown at 18, FIG. 12 and described in 5.1.3.)

A lower-limit value detector 76 provides, similarly to the upper-limit value detector 75, a lower-limit value detection signal to supply it to the lower-limit storage 22 upon reaching the number of stored information as set by a switch.

Comparing the above-described functions with the previously explained system, the addition control 70, the subtraction control 71 and the limited addition-and-subtraction counter 72 in FIG. 22 are replaced in function with the upper-limit counter control 10, the upper-limit counter 16, the lower-limit counter control 19, the lower-limit counter 20 and the delay register 26 in FIG. 7; the upper-limit value detector 75 and the lower-limit value detector 76 in FIG. 22 are respectively replaced in function with the upper-limit comparator 17 and the lower-limit comparator 18 in FIG. 7; and the duplicate write-in prohibiting control 74 in FIG. 22 is replaced in function with the comparator 27 and the time corrector 28 in FIG. 7. The idle-reading prohibiting control 73 is performed with a more simplified construction.

Figure 23:
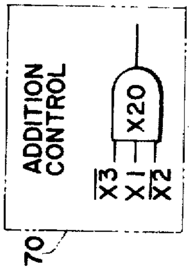
FIGS. 23 and 24 are diagrams showing an addition control and a subtraction control, respectively, both of which are illustrated in FIG. 22.

In FIG. 23, there is shown a circuit which provides the addition control 70.

The output of an addition control AND gate X20 is represented by the logic expressio.. of $\mathrm{X20 = X1\cdot\overline{X2}\cdot\overline{X3}}$. The gate X20 provides (at the "true" level) the write-in address counter control signal X1 (refer to 7, FIG. 9-1) each time it is inputted thereto during the normal operation (the period of $\overline{\mathrm{X3}}$), subject to no simultaneous generation of the read-out address counter control signal X2.

Figure 24:
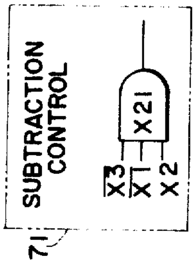

Shown in FIG. 24 is a circuit for providing the subtraction control 71. A subtraction control X21 has its output represented by the logic expression of $\mathrm{X21 = \overline{X1}\cdot X2\cdot\overline{X3}}$, and provides each inputted signal X2 during the normal operation, subject to no simultaneous generation of the signal X1.

X20 and X21 have their output terminals rendered "false" (= 0) at the simultaneous occurrence of the signals X1 and X2, and hence no addition or subtraction control is effected at such time. This means that in case where write-in and read-out are performed simultaneously (within one clock time), no change occurs in the number of stored information.

Figure 25:
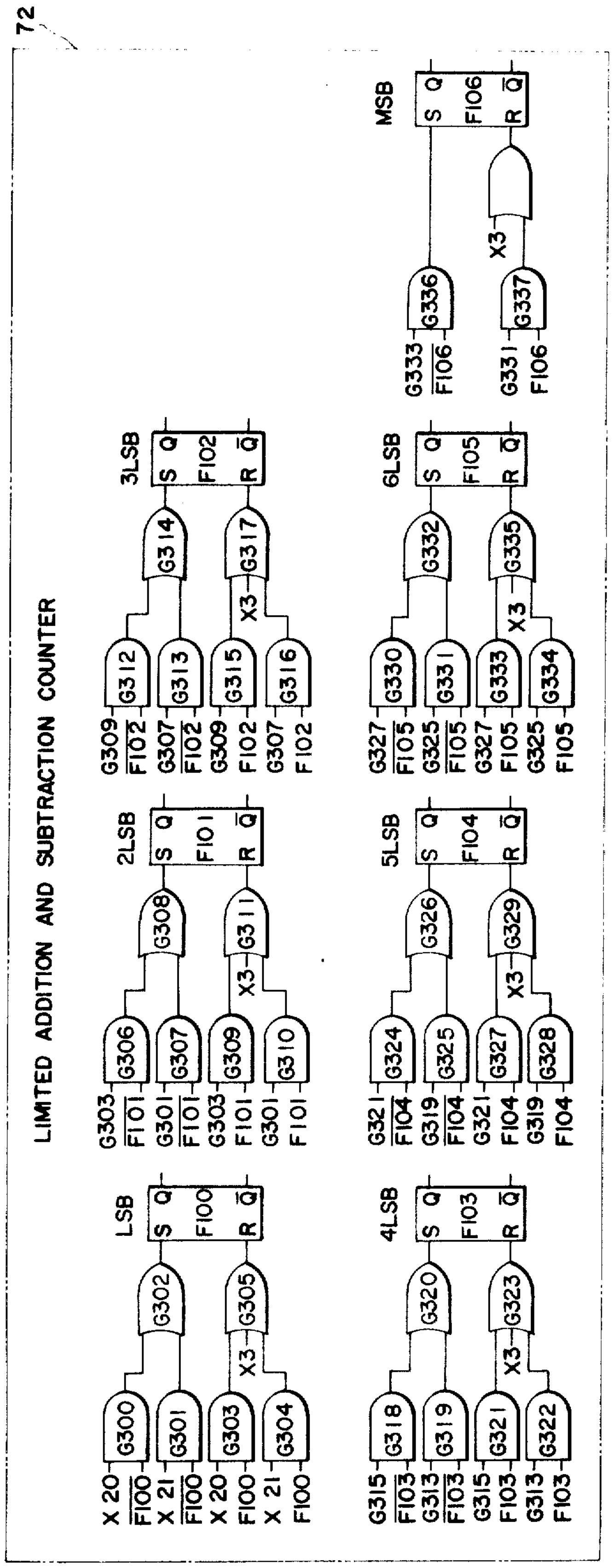
FIG. 25 is a diagram showing a limited addition-and-subtraction counter.

Referring to FIG. 25, flip-flops F100 (LSB) to F106 (MSB) carry out addition of the number of the signals X20 from the addition control 70 and subtraction of the number of the signals X21 from the subtraction control 71 within the range of Count "0" (zero) to the maximum number of counts 127.

These will be explained, using logic expressions:

LSB $$\mathrm{SF100 = \overline{F100}(X20+X21)}$$

$$\mathrm{RF100 = F100(X20+X21)+X3}$$

2LSB $$\mathrm{SF101 = \overline{F101}(X20\cdot F100+X21\cdot\overline{F100})}$$

$$\mathrm{RF101 = F100(X20\cdot F100+X21\cdot\overline{F100})+X3}$$

3LSB $$\mathrm{SF102 = \overline{F102}(X20\cdot F100\cdot F101+X21\cdot\overline{F100}\cdot\overline{F101})}$$

$$\mathrm{RF102 = F102(X20\cdot F100\cdot F101+X21\cdot\overline{F100}\cdot\overline{F101})+X3}$$

4LSB $$\mathrm{SF103 = \overline{F103}(X20\cdot F100\cdot F101\cdot F102+ X21\cdot\overline{F100}\cdot\overline{F101}\cdot\overline{F102})}$$

$$\mathrm{RF103 = F103(X20\cdot F100\cdot F101\cdot F102+ X21\cdot\overline{F100}\cdot\overline{F101}\cdot\overline{F102})+X3}$$

5LSB $$\mathrm{SF104 = \overline{F104}(X20\cdot F100\cdot F101\cdot F102\cdot F103+ X21\cdot\overline{F100}\cdot\overline{F101}\cdot\overline{F102}\cdot\overline{F103})}$$

$$\mathrm{RF104 = F104(X20\cdot F100\cdot F101\cdot F102\cdot F103+ X21\cdot\overline{F100}\cdot\overline{F101}\cdot\overline{F102}\cdot\overline{F103})+X3}$$

6LSB $$\mathrm{SF105 = \overline{F105}(X20\cdot F100\cdot F101\cdot F102\cdot F103\cdot F104 +X21\cdot\overline{F100}b.\overline{F101}\cdot\overline{F102}\cdot\overline{F103}\cdot\overline{F104})}$$

$$\mathrm{RF105 = F105(X20\cdot F100\cdot F101\cdot F102\cdot F103\cdot F104 +X21\cdot\overline{F100}b.\overline{F101}\cdot\overline{F102}\cdot\overline{F103}\cdot\overline{F104})+X3}$$

MSB $$\mathrm{SF106 = \overline{F106}\cdot X20\cdot F100\cdot F101\cdot F102\cdot F103\cdot F104\cdot F105}$$

$$\mathrm{RF106 = F106\cdot X21\cdot\overline{F100}\cdot\overline{F101}\cdot\overline{F102}\cdot\overline{F103}\cdot\overline{F104}\cdot\overline{F105}+X3}$$

Thus, count-up actions are sequentially performed at each input of Signal X20, while count-down actions are progressibely carried out at every input of Signal X21.

Figure 30:
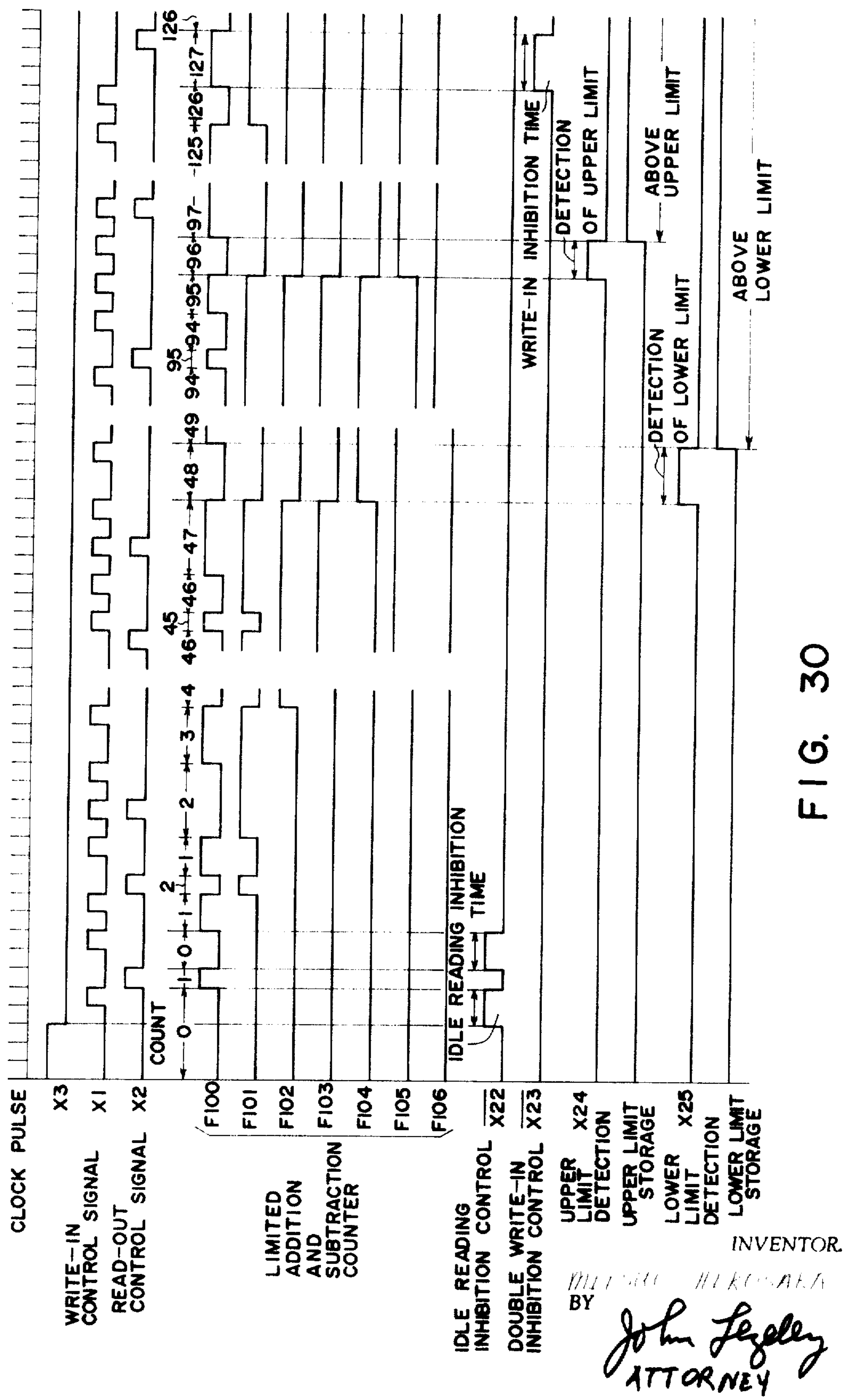
FIG. 30 is a chart illustrating the operative timing of the devices shown in FIGS. 23 to 29.

These operative states are shown at the limited addition-and-subtraction counter (F100 to F106) in the reference timing chart of FIG. 30.

A signal X3 inputted in OR to the reset logic of each of the flip-flops F100 to F106, provides resetting at the start clear and ensures an accurate counting function during the normal operation.

While this embodiment leaves one address vacant on account of the maximum number of counts being 127, one further flip-flop (F107) may be if necessary added, with the logic expressions of F106 and F107 being made as follows:

$$\mathrm{SF106 = \overline{F106}(X20\cdot F100\cdot F101\cdot F102\cdot F103\cdot F104 \cdot F105+X21b.\overline{F100}\cdot\overline{F101}\cdot\overline{F102}\cdot\overline{F103}\cdot\overline{F104}\cdot\overline{F105})}$$

$$\mathrm{RF106 = F106(X20\cdot F100\cdot F101\cdot F102\cdot F103\cdot F104 \cdot F105+X21b.\overline{F100}\cdot\overline{F101}\cdot\overline{F102}\cdot\overline{F103}\cdot\overline{F104}\cdot\overline{F105})+X3}$$

$$\mathrm{SF107 = \overline{F107}\cdot X20\cdot F100\cdot F101\cdot F102\cdot F103\cdot F104\cdot F105\cdot F106}$$

$$\mathrm{RF107 = F107\cdot X21\cdot\overline{F100}\cdot\overline{F101}\cdot\overline{F102}\cdot\overline{F103} \cdot\overline{F104}\cdot\overline{F105}\cdot\overline{F106}+X3}$$

Thus, when the control of prohibiting write-in of information is effected at the same time as the setting of F107, the total storable number of information A(128) may be fully and effectively used, and therewith, the output signal of F107 may be effectively utilized as the duplicate write-in prohibiting control.

Figure 27:
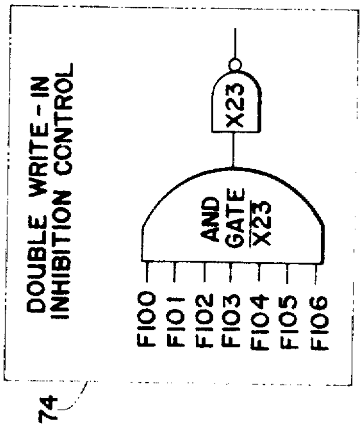
FIGS. 26 and 27 show an idle-reading prohibiting control and a duplicate write-in prohibiting control, respectively.

(In this case, $\overline{\mathrm{F107}}$ = X23 (FIG. 27) applies, so the prohibiting control 74 in FIG. 27 becomes unnecessary.)

In addition, the counting states of F100 to F106, i.e., the number of stored information in the buffer storage unit can be monitored by a digital device (for example, a decade display) as may be needed.

Furthermore, it is possible to monitor the storage states of the buffer storage unit, in simple manner. For example, with only the output of F106, there may be monitored whether the number of stored information is over or below 50 percent (64 information). With an AND output of F106·F105, there may be monitored if the number of stored information is over or below 75 percent (96 information).

Description will hereunder be made of circuits which respectively perform the idle-reading prohibiting and duplicate write-in prohibiting controls (the prevention of saturation) of the buffer storage unit.

Figure 26:
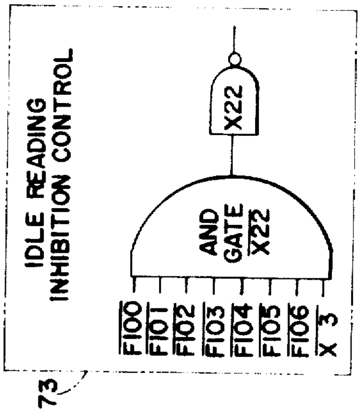

Referring to FIG. 26, the output logic expression of an AND gate $\overline{X22}$ of 73 is represented by $\overline{X22} = \overline{X3}\cdot\overline{F100}\cdot\overline{F101}\cdot\overline{F102}\cdot\overline{F103}\cdot\overline{F104}\cdot\overline{F105}\cdot\overline{F106}$· That is, the gate detects during the normal operation, that the limited addition-and-subtraction counter is under the state of Count "0" (the number of stored information being zero). The output level thereof becomes "true" (= 1) at the detection, and is inverted by a NOT gate X22 to be outputted as an idle-reading prohibiting control signal.

In FIG. 27, the output logic expression of an AND gate $\overline{X23}$ of 74 is represented by $\overline{X23}$ = F100·F101·F102·F103·F104·F105·F106. That is, the gate detects the state immediately before saturation at the maximum number of counts 127 (the number of stored information being 127). The output level thereof becomes "true" (= 1) at the detection, and is inverted by a NOT gate X23 to be outputted as a duplicate write-in prohibiting control signal.

These perative states are shown at the idle-reading prohibiting control ($\overline{X22}$) and the duplicate write-in prohibiting control ($\overline{X23}$) in the reference timing chart of FIG. 30.

Figure 28:
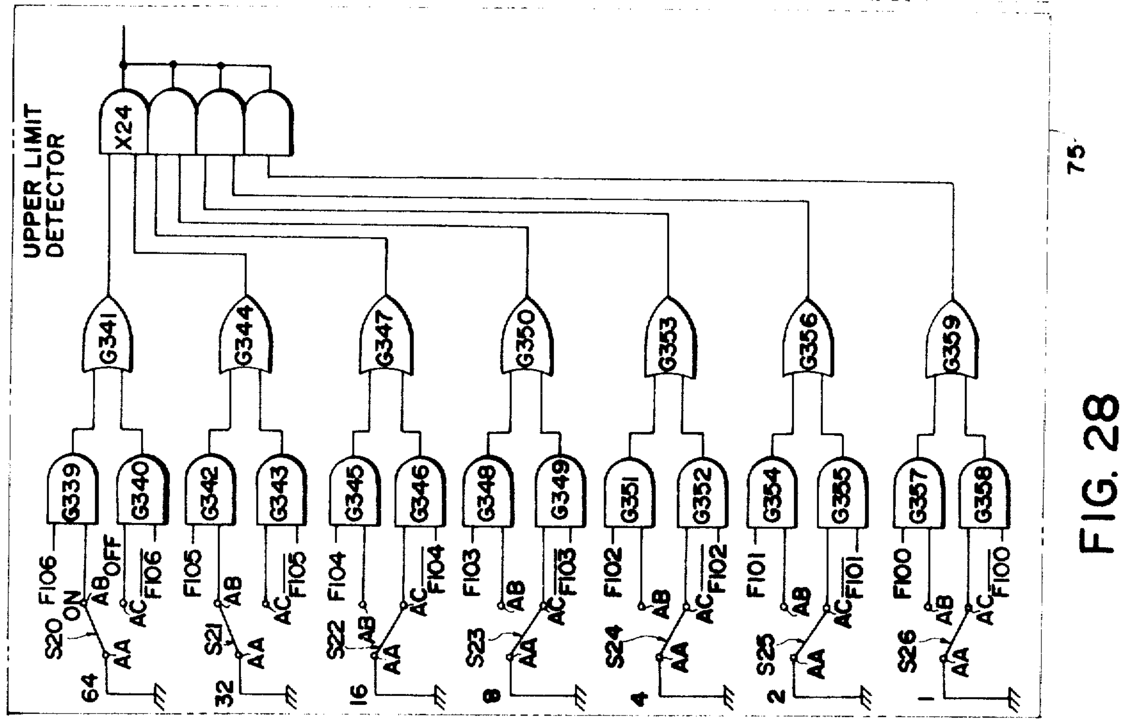

In FIG. 28, a circuit of the upper-limit value detector 75 is shown. Switches S20 to S26 as shown determine the upper-limit values to-be-detected, respectively. An output AND gate X24 of the upper-limit value detector will provide detection, when the number of counts in the limited addition-and-subtraction counter coincides with the number of counts in accordance with the switch setting, i.e., when the number of stored information in the buffer storage unit coincides with the set number of the switches.

The logic expression X24 is represented by:

$$
\begin{aligned}
X24 = &(S20AB\cdot F106+S20AC\cdot\overline{F106})\\
&\cdot(S21AB\cdot F105+S21AC\cdot\overline{F105})\\
&\cdot(S22AB\cdot F104+S22AC\cdot\overline{F104})\\
&\cdot(S23AB\cdot F103+S23AC\cdot\overline{F103})\\
&\cdot(S24AB\cdot F102+S24AC\cdot\overline{F102})\\
&\cdot(S25AB\cdot F101+S25AC\cdot\overline{F101})\\
&\cdot(S26AB\cdot F100+S26AC\cdot\overline{F100})
\end{aligned}
$$

If, as shown in the figure, only the switches S20 and S21 are thrown to ON positions (Positions AB) with all the remaining ones being thrown to OFF positions (Positions AC), then the upper-limit value will be Count 96. As a result, when the addition-and-subtraction counter is of Count 96 (the number of stored information being 96), the output of the output gate X24 of the upper-limit value detector will fall into the "true" (=1) level, thereby to supply an upper-limit value detection signal to the upper-limit storage (18 in FIG. 22).

Figure 29:
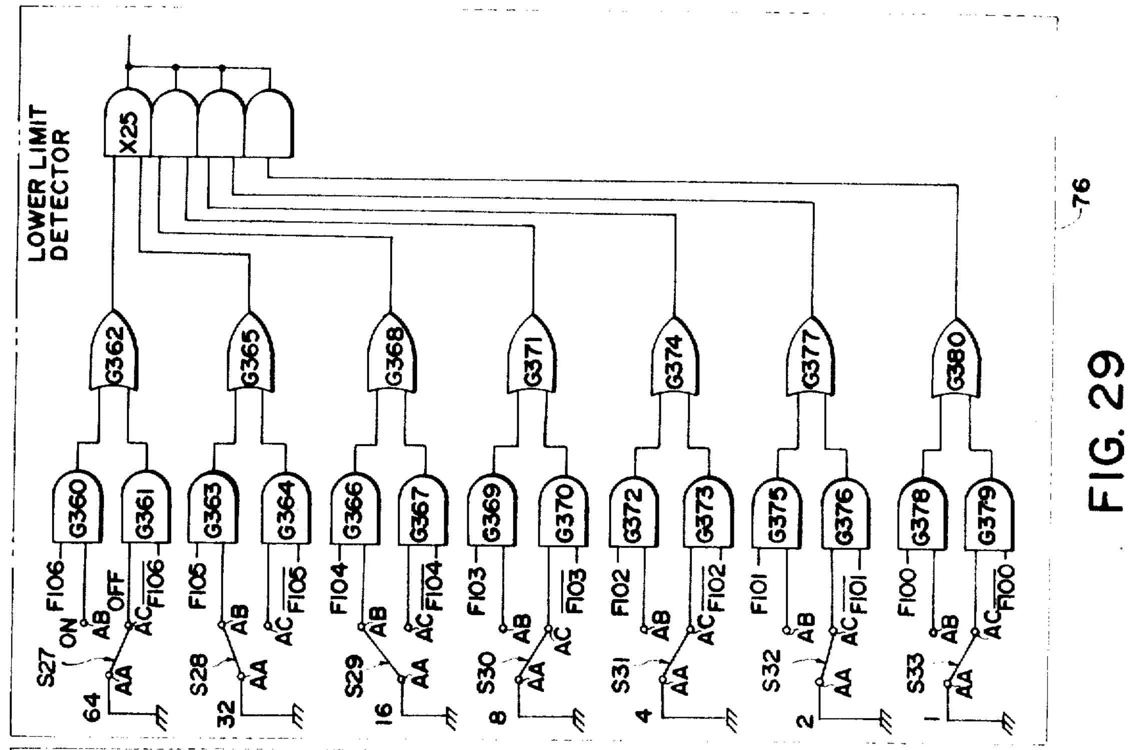
FIGS. 28 and 29 show an upper-limit detector and a lower-limit detector, respectively.

Shown in FIG. 29 is a circuit for providing the lower-limit value detector 76 quite similar in function to the upper-limit value detector 75. Now, in brief, the logic expression of an output AND gate X25 of the lower-limit value detector is given as follows:

$$
\begin{aligned}
X25 = &(S27AB\cdot F106+S27AC\cdot\overline{F106})\\
&\cdot(S28AB\cdot F105+S28AC\cdot\overline{F105})\\
&\cdot(S29AB\cdot F104+S29AC\cdot\overline{F104})\\
&\cdot(S30AB\cdot F103+S30AC\cdot\overline{F103})\\
&\cdot(S31AB\cdot F102+S31AC\cdot\overline{F102})\\
&\cdot(S32AB\cdot F101+S32AC\cdot\overline{F101})\\
&\cdot(S33AB\cdot F100+S33AC\cdot\overline{F100})
\end{aligned}
$$

The gate X25 detects the time when the number of stored information coincides with the number of counts as determined by the setting of switches S27 to S33, and the output thereof is supplied to the lower-limit storage (22 in FIG. 22).

The upper-limit value detector output X24 as well as the lower-limit value detector output X25 are shown in the reference timing chart of FIG. 30.

The timing chart shown in FIG. 30 is a reference one for facilitating understanding of the operations of this embodiment of the control system using the limited addition-and-subtraction counter as having been described in Section 6.2 and thereafter.

Brief explanation will be sequentially made from the upper part of the drawing. Shown at the uppermost part is a train of clock pulses. The signal X3 (refer to 60 in FIG. 9-1) shown directly below the pulses, becomes "true" (= 1) in level at the start clear, and forcibly resets the addition-and-subtraction counter F100 to F106 in such "true" period. Simultaneously when the signal X3 is rendered "false" (= 0), the normal operation will be started to progressively perform write-in and read-out of information in the buffer storage unit. The operative states of the write-in and read-out are shown by Signals X1 and X2, respectively.

The limited addition-and-subtraction counter F100 to F106 (FIG. 25) carries out the addition-and-subtraction counting through controls of the signals X1 (refer to X20, FIG. 23) and X2 (refer to X21, FIG. 24), thereby to count the stored number of information in the buffer storage unit. The counting state is shown, for reference, in the numbers of the counts (the number of stored information) above F100. The output $\overline{X22}$ of the idle-reading prohibiting controller (FIG. 26) remains "true" in level for the period of Count "0" (zero) or of zero stored information during the normal operation, thus prohibiting idel reading.

The output $\overline{X23}$ of the duplicate write-in prohibiting controller (FIG. 27) falls into the "true" level simultaneously with the maximum number of counts 127 or saturation being reached, thereby to prohibit write-in in the buffer storage unit.

The upper-limit value detection X24 (FIG. 28) provides a detection signal (at the "true" level) for the period during which the number of counts in the limited addition-and-subtraction counter is equal to the upper-limit value 96 in conformity with the switch setting or to the number of stored information 96.

By means of the upper-limit value detecting signal, the upper-limit storage stores the state.

The lower-limit value detection X25 (FIG. 29) provides a detection signal (at the "true" level) for the period of the lower-limit value 48 in accordance with the switch setting or of the number of stored information 48.

By means of the lower-limit value detecting signal, the lower-limit storage stores the state.

What is claimed is:

1. A digital data processing system having a buffer storage including a write-in address counter and a read-out address counter, comprising a register operative to effect counting in synchronism with the counting of said read-out address counter, the number of counts of said register being a predetermined number of counts smaller than that of said read-out address counter at all times, a comparator for comparing the numbers of counts of said register and said write-in address counter to generate a coincidence signal upon coincidence of those numbers, and an information input gate responsive to said coincidence signal to shut off the flow of input information into the buffer storage.

2. A digital data processing system as set forth in claim 1, in which said predetermined number of counts is small as compared with the total number of address locations in the buffer storage.

3. A digital data processing system as set forth in claim 1, further comprising a time corrector connected between said comparator and information input gate to delay said coincidence signal by a predetermined period of time.

4. A digital data processing system as set forth in claim 1, further comprising a plurality of counters operative to effect countings in synchronism with the counting of said read-out address counter, a plurality of counter controls for setting the respective numbers of counts of said plurality of counters to predetermined different values, a plurality of comparators for comparing the respective numbers of counts of said plurality of counters with that of said write-in address counter to generate coincidence signals upon coincidence of those numbers, and means responsive to said coincidence signals to control the flow of input information into the buffer storage.

5. A digital data processing system as set forth in claim 4, in which said control means comprises a plurality of stores for storing said coincidence signals to generate a plurality of signals indicating the amount of information stored in the buffer storage, and a detection-reference controller responsive to said plurality of signals to automatically select a proper detection reference in the digital data processing and track information detecting structure of a radar track information processing system.

6. A digital data processing system as set forth in claim 5, further comprising an interference-eliminating circuit selector connected to said detection-reference controller and operable to select a proper interference-eliminating circuit in radar equipment when the amount of input information being supplied to the buffer storage falls beyond control of said detection-reference controller.

7. A digital data processing system as set forth in claim 1, comprising an upper-limit counter operative to effect counting in synchronism with the counting of said read-out address counter, a lower-limit counter operative to effect counting in synchronism with the counting of said read-out address counter, an upper-limit counter control for setting the number of counts of said upper-limit counter to a first predetermined value, a lower-limit counter control for setting the number of counts of said lower-limit counter to a second predetermined value, an upper-limit comparator for comparing the numbers of counts of said upper-limit counter and said write-in address counter to generate a coincidence signal upon coincidence of those numbers, a lower-limit comparator for comparing the numbers of counts of said lower-limit counter and said write-in address counter to generate a coincidence signal upon coincidence of those numbers, and means responsive to said coincidence signals to control the flow of input information into the buffer storage so as to keep the amount of information stored in the buffer storage at values between the upper and lower limits corresponding to said first and second predetermined values, respectively.

8. A digital data processing system as set forth in claim 1, further comprising a register for up counting in response to the counting of said write-in address counter and for down counting in response to the counting of said read-out address counter, and means connected to said register to prevent idle reading when the number of counts of said register decreases to zero.

9. A digital data processing system as set forth in claim 8, further comprising means connected to said register to prevent double writing when the number of counts of said register increases to the maximum count.

10. A digital data processing system as set forth in claim 8, further comprising a plurality of detectors for detecting coincidence of the number of counts of said register with the respective predetermined numbers of counts to generate coincidence signals upon coincidence, and a plurality of stores for storing said coincidence signals to generate a plurality of signals indicating the amount of information stored in the buffer storage.

* * * * *